United States Patent
Filippov et al.

(10) Patent No.: US 11,245,897 B2
(45) Date of Patent: Feb. 8, 2022

(54) METHODS AND APPARATUSES FOR SIGNALING PARTIONING INFORMATION FOR PICTURE ENCODING AND DECODING

(71) Applicant: Huawei Technologies Co., Ltd., Shenzhen (CN)

(72) Inventors: Alexey Konstantinovich Filippov, Moscow (RU); Alexander Alexandrovich Karabutov, Moscow (RU); Shan Liu, Shenzhen (CN); Vasily Alexeevich Rufitskiy, Moscow (RU)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/854,665

(22) Filed: Apr. 21, 2020

(65) Prior Publication Data
US 2020/0252609 A1      Aug. 6, 2020

Related U.S. Application Data

(63) Continuation of application No. PCT/RU2017/000794, filed on Oct. 27, 2017.

(51) Int. Cl.
*H04N 19/119*      (2014.01)
*H04N 19/105*      (2014.01)
(Continued)

(52) U.S. Cl.
CPC ......... *H04N 19/119* (2014.11); *H04N 19/105* (2014.11); *H04N 19/176* (2014.11); *H04N 19/33* (2014.11)

(58) Field of Classification Search
CPC .. H04N 19/119; H04N 19/105; H04N 19/176; H04N 19/33; H04N 19/91; H04N 19/13
(Continued)

(56) References Cited

U.S. PATENT DOCUMENTS 9,451,287 B2 *   9/2016  Chien ................... H04N 19/13
2015/0195539 A1   7/2015  Lee et al.
(Continued)

FOREIGN PATENT DOCUMENTS

CN      103828364 A      5/2014
CN      104883569 A      9/2015
(Continued)

OTHER PUBLICATIONS

F. Le Leannec et al., "Asymmetric Coding Units in QTBT," Joint Video Exploration Team (JVET) of ITU-T SG 16 WP 3 and ISO/IEC JTC 1/SC 29/WG 11, 4th Meeting: Chengdu, CN, Document: JVET-D0064, XP030150297, pp. 1-10 (Oct. 15-21, 2016).
(Continued)

*Primary Examiner* — Susan E. Hodges
(74) *Attorney, Agent, or Firm* — Leydig, Voit & Mayer, Ltd.

(57) ABSTRACT

A picture encoding apparatus configured to hierarchically partition a block of picture data into sub-blocks; determine that a sub-block being coded belongs to an unequally-sized partitioned block; prepare a list of neighboring blocks for the sub-block of the unequally-sized partitioned block based on a size of the sub-block of the unequally-sized partitioned block and a partitioning type of at least one neighboring block of the unequally-sized partitioned block; and derive a context model that is used to encode split information of the sub-block of the unequally-sized partitioned block into a bit stream based on the prepared list of neighboring blocks.

12 Claims, 13 Drawing Sheets

(51) Int. Cl.
*H04N 19/176* (2014.01)
*H04N 19/33* (2014.01)

(58) Field of Classification Search
USPC .......................................................... 375/240
See application file for complete search history.

(56) References Cited

U.S. PATENT DOCUMENTS

| | | | |
|---|---|---|---|
| 2015/0312588 A1* | 10/2015 | Yamamoto | H04N 19/577 375/240.15 |
| 2016/0156924 A1 | 6/2016 | Lee et al. | |
| 2016/0219276 A1 | 7/2016 | Li et al. | |
| 2017/0188031 A1 | 6/2017 | Lee et al. | |
| 2017/0208336 A1 | 7/2017 | Li et al. | |
| 2017/0347095 A1* | 11/2017 | Panusopone | H04N 19/96 |
| 2018/0332288 A1* | 11/2018 | Hsiang | H04N 19/70 |

FOREIGN PATENT DOCUMENTS

| | | |
|---|---|---|
| EP | 2763414 A1 | 8/2014 |
| WO | 2017088810 A1 | 6/2017 |
| WO | 2017123980 A1 | 7/2017 |

OTHER PUBLICATIONS

Li et al., "Multi-Type-Tree," Joint Video Exploration Team (JVET) of ITU-T SG 16 WP 3 and ISO/EC JTC 1/SC 29/WG 11, 4th Meeting: Chengdu, CN, Document: JVET-D0117r1, XP030150367, pp. 1-3 (Oct. 15-21, 2016).

"Information technology—High efficiency coding and media delivery in heterogeneous environments—Part 2: High efficiency video coding," International Standard, ISO/IEC 23008-2, total 13 pages (Dec. 2013).

Sullivan et al., "Overview of the High Efficiency Video Coding (HEVC) Standard," IEEE Transactions on Circuits and Systems for Video Technology, vol. 22, No. 12, pp. 1649-1668, Institute of Electrical and Electronics Engineers, New York, New York (Dec. 2012).

"Future video coding: Joint Exploration Model 1 (JEM1) for future video coding investigation," Study Group 16 TD 213 (WP 3/16), pp. 1-20, International Telecommunication Union, Geneva, Switzerland (Oct. 12-23, 2015).

Alshina et al., "Performance of JEM1.0 tools analysis by Samsung," Joint Video Exploration Team (JVET) of ITU-T SG 16 WP 3 and ISO/IEC JTC 1/SC 29/WG 11, 2nd Meeting: San Diego, USA, Document: JVET-B0022_r1, total 28 pages (Feb. 20-26, 2016).

\* cited by examiner

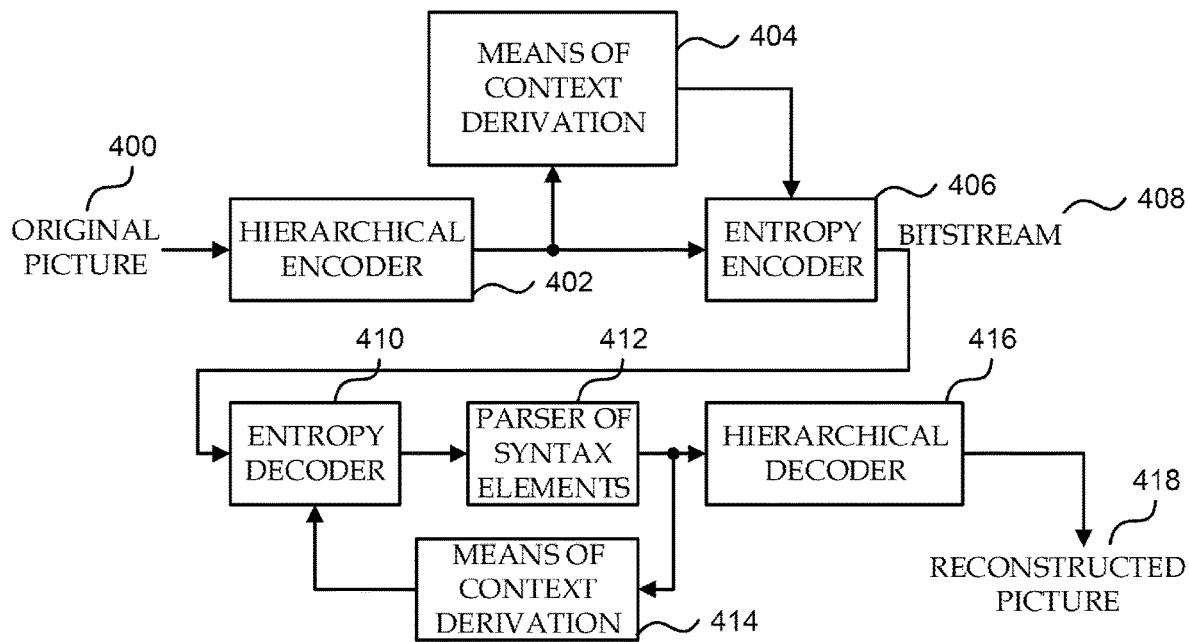
Fig. 4
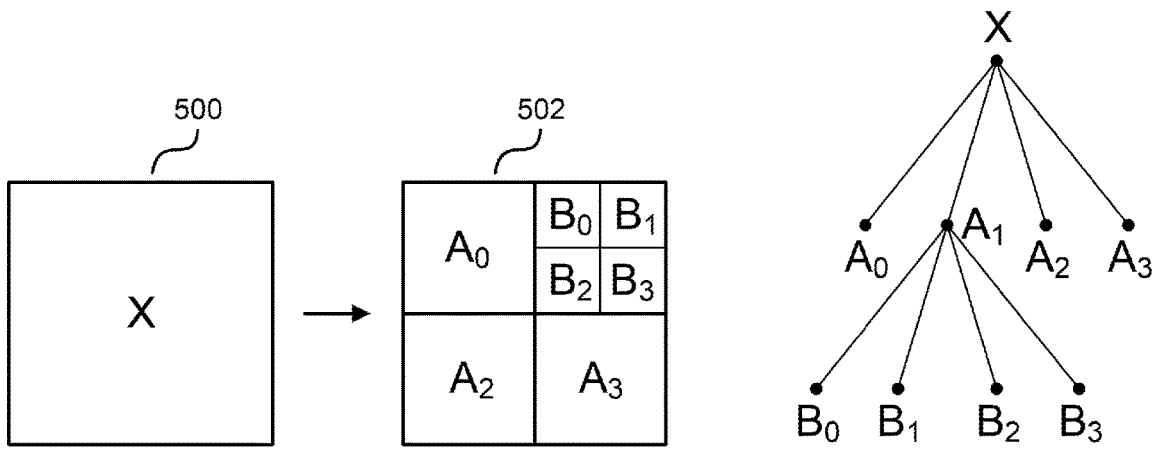
Fig. 5A                    Fig. 5B

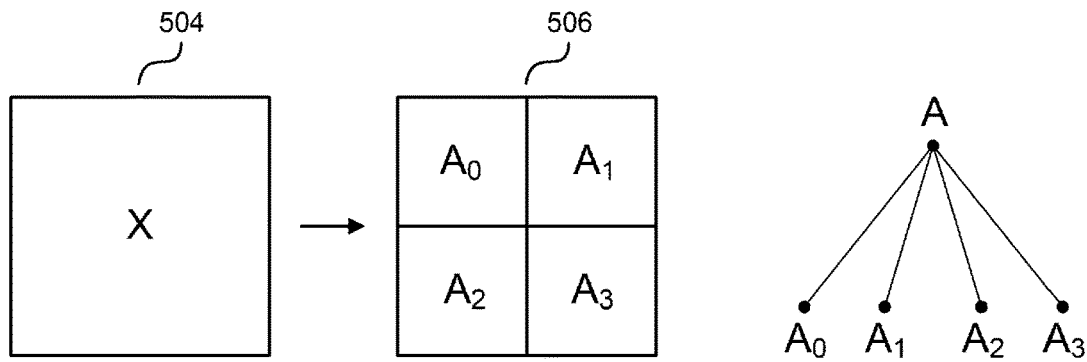
Fig. 5C                Fig. 5D
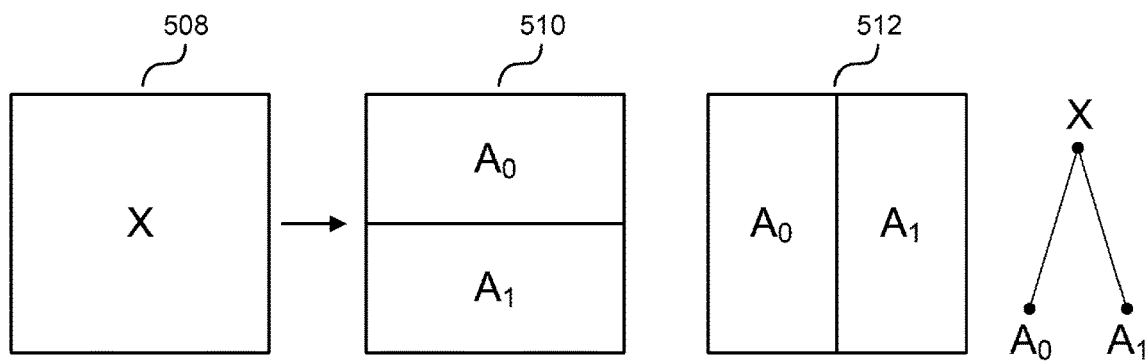
Fig. 5E                Fig. 5F
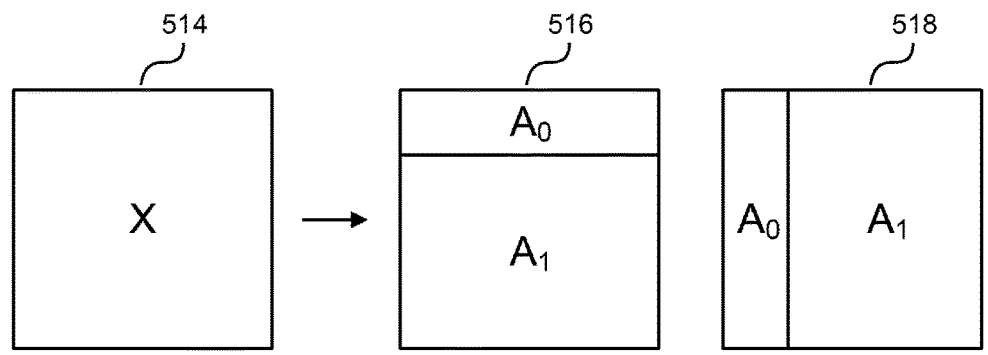
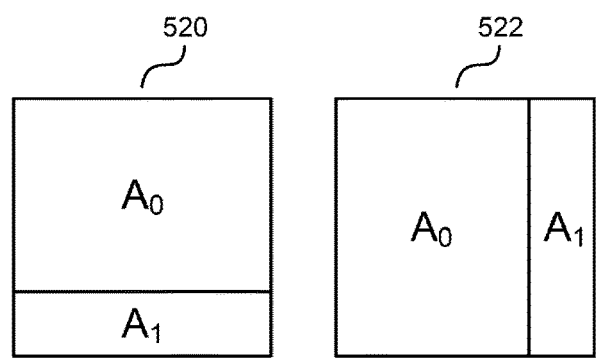
Fig. 5G

METHODS AND APPARATUSES FOR SIGNALING PARTITIONING INFORMATION FOR PICTURE ENCODING AND DECODING

CROSS-REFERENCE TO RELATED APPLICATIONS

This application is a continuation of International Application No. PCT/RU2017/000794, filed on Oct. 27, 2017, the disclosure of which is hereby incorporated by reference in its entirety.

TECHNICAL FIELD

Embodiments of the present invention relate to the field of image processing, for example, image and/or video coding and/or decoding.

BACKGROUND

Digital video communication and storage applications are implemented by a wide range of digital devices, for example, digital cameras, cellular radio telephones, laptops, broadcasting systems, and video teleconferencing systems. One of the most important and challenging tasks of these applications is video compression. The task of video compression is complex and is constrained by two contradicting parameters: compression efficiency and computational complexity. Video coding standards, such as ITU-T H.264/AVC (Advance Video Coding) or ITU-T H.265/HEVC (High Efficiency Video Coding), provide a good tradeoff between these parameters.

When encoding a video, a hierarchical encoder produces various syntax elements that are further signaled into a bit stream according to an assigned probability model. Syntax elements comprise data that represents how a picture is split into blocks. It is important that an entropy decoder is assigned the same context models that were assigned on the encoder side. Otherwise, the parsing and decoding processes cannot be correctly performed, because wrong values of syntax elements are parsed from the bit stream. As a consequence of this requirement, means of context derivation should not have differences at the encoder and decoder sides, and the same context models for the same input sequence of syntax elements should be provided at both sides. Syntax elements comprise data that represents how a picture is split into blocks. Covering a picture with a set of blocks can be referred to as partitioning. If blocks are of the same size, partitioning is considered to be regular. Hierarchical partitioning consists in splitting a block into smaller sub-blocks. Each of these sub-blocks could be further partitioned up to the smallest size possible. In the HEVC standard, a picture is regularly split into the largest coding units (LCUs), and each of these units could be further hierarchically partitioned. Encoding and parsing processes for hierarchically partitioned blocks is a recursive procedure, wherein a recursion step can be represented by a node of a tree structure. Each node within a tree-based representation has its split depth, i.e. a number of nodes in the path from this node to the root of the tree.

Unequally-sized partitioning produces sub-blocks of different sizes, and thus, the nodes of the same depth within a multi-type partitioning tree may represent regions of different sizes. Therefore split depth is not an accurate criterion to rely on when performing probability modeling.

SUMMARY

It is the object of the disclosure to provide an efficient concept for motion picture encoding and decoding processes that use hierarchical tree-based partitioning schemes with equal and unequal block partitioning.

This object is achieved by the features of the independent claims. Further embodiments of the disclosure are apparent from the dependent claims, the description and the figures.

The disclosed solution is based on the fact that a list of neighboring blocks for a sub-block of an unequally-sized partitioned block is prepared in a particular way. The list is prepared based on a size of the sub-block of the unequally-sized partitioned block and a partitioning type of at least one neighboring block of the unequally-sized partitioned block when deriving a context model for splitting the sub-block.

According to a first aspect, there is provided a picture encoding apparatus comprising a processing circuitry configured to hierarchically partition a block of picture data into sub-blocks, determine that a sub-block being encoded belongs to an unequally-sized partitioned block, prepare a list of neighboring blocks for the sub-block of the unequally-sized partitioned block based on a size of the sub-block of the unequally-sized partitioned block and a partitioning type of at least one neighboring block of the unequally-sized partitioned block, and derive a context model that is used to encode split information of the sub-block of the unequally-sized partitioned block into a bit stream based on the prepared list of neighboring blocks.

The sub-block being encoded may be a child block of the unequally-sized partitioned block. Thus the unequally-sized partitioned block may be an unequally-sized partitioned parent block. The unequally-sized block may be the block of picture data or a first level sub-block obtained by partitioning the block of picture data. Accordingly, the sub-block being encoded may be a sub-block obtained by partitioning the block of picture data or any sub-block of the block of picture data. The unequally sized partitioned block may be a rectangular block.

In an implementation form of the first aspect, the sub-block of the unequally-sized partitioned block is one of a smaller sub-block of the unequally-sized partitioned block and a larger sub-block of the unequally-sized partitioned block.

In a further implementation form of the first aspect, the sub-block being encoded is a larger sub-block of the unequally-sized partitioned block, and the processing circuitry is further configured to include a neighboring block of the unequally-sized partitioned block in the list of neighboring blocks of the larger sub-block, and omit a smaller sub-block of the unequally-sized partitioned block from the list of neighboring blocks of the larger sub-block.

In a further implementation form of the first aspect, the processing circuitry is configured to omit a neighboring block of the unequally-sized partitioned block from the list of neighboring blocks of the larger block, the neighboring block being a smaller sub-block of an unequally-sized partitioned block.

In a further implementation form of the first aspect, the sub-block being encoded is a smaller sub-block of the unequally-sized partitioned block, and the processing circuitry is further configured to include a neighboring block of the unequally-sized partitioned block in the list of neighboring blocks of the smaller sub-block, the neighboring block being a result of an equally-sized partitioned block, and omit a neighboring block adjacent to a shorter side of the smaller sub-block, the neighboring block failing to be a smaller sub-block of an unequally-sized partitioned block, from the list of neighboring blocks of the smaller sub-block.

In a further implementation form of the first aspect, the sub-block being encoded is a smaller sub-block of the unequally-sized partitioned block, and the processing circuitry is further configured to include another smaller sub-block of the unequally-sized partitioned block following a larger sub-block of the unequally-sized partitioned block in the list of neighboring blocks of the smaller sub-block, omit the larger sub-block of the unequally-sized partitioned block from the list of neighboring blocks of the smaller sub-block, and omit a neighboring block adjacent to a shorter side of the smaller sub-block, the neighboring block failing to be a smaller sub-block of an unequally-sized partitioned block, from the list of neighboring blocks of the smaller sub-block of the unequally-sized partitioned block.

In a further implementation form of the first aspect, the sub-block being encoded is a smaller sub-block of the unequally-sized partitioned block, and the processing circuitry is further configured to include a neighboring block of the unequally-sized partitioned block in the list of neighboring blocks of the smaller sub-block, the neighboring block being a smaller sub-block of an unequally-sized portioned block, omit a larger sub-block of the of the unequally partitioned block when the smaller sub-block is not aligned with left or top side of the unequally partitioned block, and omit a neighboring block of the unequally-sized partitioned block from the list of neighboring blocks of the smaller sub-block, the neighboring block being a larger sub-block of an unequally-sized partitioned block.

In a further implementation form of the first aspect, the unequally-sized partitioning comprises one of an asymmetric partitioning and a triple-tree partitioning.

According to a second aspect, there is provided a picture decoding apparatus comprising a processing circuitry configured to receive a bit stream, hierarchically partition a block of picture data into sub-blocks, determine that a sub-block being decoded belong to an unequally-sized partitioned block, prepare a list of neighboring blocks for the sub-block of the unequally-sized partitioned block based on a size of the sub-block of the unequally-sized partitioned block and a partitioning type of at least one neighboring block of the unequally-sized partitioned block, and derive a context model that is used to decode split information of the sub-block of the unequally-sized partitioned block from the bit stream based on the prepared list of neighboring blocks.

In an implementation form of the first aspect, the sub-block of the unequally-sized partitioned block is one of a smaller sub-block of the unequally-sized partitioned block and a larger sub-block of the unequally-sized partitioned block.

The sub-block being decoded may be a child block of the unequally-sized partitioned block. Thus the unequally-sized partitioned block may be an unequally-sized partitioned parent block. The unequally-sized block may be the block of picture data or a first level sub-block obtained by partitioning the block of picture data. Accordingly, the sub-block being decoded may be a sub-block obtained by partitioning the block of picture data or any sub-block of the block of picture data.

In a further implementation form of the second aspect, the sub-block being decoded is a larger sub-block of the unequally-sized partitioned block, and wherein the processing circuitry is configured to include a neighboring block of the unequally-sized partitioned block in the list of neighboring blocks of the larger sub-block, and omit a smaller sub-block of the unequally-sized partitioned block from the list of neighboring blocks of the larger sub-block.

In a further implementation form of the second aspect, the processing circuitry is further configured to omit a neighboring block of the unequally-sized partitioned block from the list of neighboring blocks of the larger block, the neighboring block being a smaller sub-block of an unequally-sized partitioned block.

In a further implementation form of the second aspect, the sub-block being decoded is a smaller sub-block of the unequally-sized partitioned block, and the processing circuitry is further configured to include a neighboring block of the unequally-sized partitioned block in the list of neighboring blocks of the smaller sub-block, the neighboring block being a result of an equally-sized partitioned block, and omit a neighboring block adjacent to a shorter side of the smaller sub-block, the neighboring block failing to be a smaller sub-block of an unequally-sized partitioned block, from the list of neighboring blocks of the smaller sub-block.

In a further implementation form of the second aspect, the sub-block being decoded is a smaller sub-block of the unequally-sized partitioned block, and the processing circuitry is further configured to include another smaller sub-block of the unequally-sized partitioned block following a larger sub-block of the unequally-sized partitioned block in the list of neighboring blocks of the smaller sub-block, omit the larger sub-block of the unequally-sized partitioned block from the list of neighboring blocks of the smaller sub-block, and omit a neighboring block adjacent to a shorter side of the smaller sub-block, the neighboring block failing to be a smaller sub-block of an unequally-sized partitioned block, from the list of neighboring blocks of the smaller sub-block of the unequally-sized partitioned block.

In a further implementation form of the second aspect, the sub-block being decoded is a smaller sub-block of the unequally-sized partitioned block, and the processing circuitry is further configured to include a neighboring block of the unequally-sized partitioned block in the list of neighboring blocks of the smaller sub-block, the neighboring block being a smaller sub-block of an unequally-sized portioned block, omit a larger sub-block of the of the unequally partitioned block when the smaller sub-block is not aligned with left or top side of the unequally partitioned sub-block, and omit a neighboring block of the unequally-sized partitioned block from the list of neighboring blocks of the smaller sub-block, the neighboring block, the neighboring block being a larger sub-block of an unequally-sized partitioning block.

In a further implementation form of the second aspect, the unequally-sized partitioning comprises one of an asymmetric partitioning and a triple-tree partitioning.

According to a third aspect, there is provided a method for encoding a picture, the method comprising hierarchically partitioning a block of picture data into sub-blocks, determining that a sub-block being coded belongs to an unequally-sized partitioned block, preparing a list of neighboring blocks for the sub-block of the unequally-sized partitioned block based on a size of the sub-block of the unequally-sized partitioned block and a partitioning type of at least one neighboring block of the unequally-sized partitioned block, and deriving a context model that is used to encode split information of the sub-block of the unequally-sized partitioned block into a bit stream based on the prepared list of neighboring blocks.

In an implementation form of the first aspect, the sub-block of the unequally-sized partitioned block is one of a smaller sub-block of the unequally-sized partitioned block and a larger sub-block of the unequally-sized partitioned block.

In a further implementation form of the third aspect, the sub-block being encoded is a larger sub-block of the unequally-sized partitioned block, and the method further comprises including a neighboring block of the unequally-sized partitioned block in the list of neighboring blocks of the larger sub-block, and omitting a smaller sub-block of the unequally-sized partitioned block from the list of neighboring blocks of the larger sub-block.

In a further implementation form of the third aspect, the method further comprises omitting a neighboring block of the unequally-sized partitioned block from the list of neighboring blocks of the larger block, the neighboring block being a smaller sub-block of an unequally-sized partitioned block.

In a further implementation form of the third aspect, the sub-block being encoded is a smaller sub-block of the unequally-sized partitioned block, and the method further comprises including a neighboring block of the unequally-sized partitioned block in the list of neighboring blocks of the smaller sub-block, the neighboring block being a result of an equally-sized partitioned block, and omitting a neighboring block adjacent to a shorter side of the smaller sub-block, the neighboring block failing to be a smaller sub-block of an unequally-sized partitioned block, from the list of neighboring blocks of the smaller sub-block.

In a further implementation form of the third aspect, the sub-block being encoded is a smaller sub-block of the unequally-sized partitioned block, and the method further comprises including another smaller sub-block of the unequally-sized partitioned block following a larger sub-block of the unequally-sized partitioned block in the list of neighboring blocks of the smaller sub-block, omitting the larger sub-block of the unequally-sized partitioned block from the list of neighboring blocks of the smaller sub-block, and omitting a neighboring block adjacent to a shorter side of the smaller sub-block, the neighboring block failing to belong to be a smaller sub-block of an unequally-sized partitioned block, from the list of neighboring blocks of the smaller sub-block of the unequally-sized partitioned block.

In a further implementation form of the third aspect, the sub-block being encoded is a smaller sub-block of the unequally-sized partitioned block, and the method further comprises including a neighboring block of the unequally-sized partitioned block in the list of neighboring blocks of the smaller sub-block, the neighboring block being a smaller sub-block of an unequally-sized portioned block, omitting a larger sub-block of the of the unequally partitioned block when the smaller sub-block is not aligned with left or top side of the unequally partitioned block, and omitting a neighboring block of the unequally-sized partitioned block from the list of neighboring blocks of the smaller sub-block, the neighboring block being a larger sub-block of an unequally-sized partitioned block.

In a further implementation form of the third aspect, the unequally-sized partitioning comprises one of an asymmetric partitioning and a triple-tree partitioning.

According to a fourth aspect, there is provided a method for decoding a picture, the method comprising receiving a bit stream, hierarchically partitioning a block of picture data into sub-blocks, determining that a sub-block being belongs to an unequally-sized partitioned block, preparing a list of neighboring blocks for the sub-block of the unequally-sized partitioned block based on a size of the sub-block of the unequally-sized partitioned block and a partitioning type of at least one neighboring block of the unequally-sized partitioned block, and deriving a context model that is used to decode split information of the sub-block of the unequally-sized partitioned block from the bit stream based on the prepared list of neighboring blocks.

In an implementation form of the first aspect, the sub-block of the unequally-sized partitioned block is one of a smaller sub-block of the unequally-sized partitioned block and a larger sub-block of the unequally-sized partitioned block.

In a further implementation form of the fourth aspect, the sub-block being decoded is a larger sub-block of the unequally-sized partitioned block, and the method further comprises including a neighboring block of the unequally-sized partitioned block in the list of neighboring blocks of the larger sub-block, and omitting a smaller sub-block of the unequally-sized partitioned block from the list of neighboring blocks of the larger sub-block.

In a further implementation form of the fourth aspect, the method further comprises omitting a neighboring block of the unequally-sized partitioned block from the list of neighboring blocks of the larger block, the neighboring block being a smaller sub-block of an unequally-sized partitioned block.

In a further implementation form of the fourth aspect, the sub-block being decoded is a smaller sub-block of the unequally-sized partitioned block, and the method further comprises including a neighboring block of the unequally-sized partitioned block in the list of neighboring blocks of the smaller sub-block, the neighboring block being a result of an equally-sized partitioned block, and omitting a neighboring block adjacent to a shorter side of the smaller sub-block, the neighboring block failing to be a smaller sub-block of an unequally-sized partitioned block, from the list of neighboring blocks of the smaller sub-block.

In a further implementation form of the fourth aspect, the sub-block being decoded is a smaller sub-block of the unequally-sized partitioned block, and the method further comprises including another smaller sub-block of the unequally-sized partitioned block following a larger sub-block of the unequally-sized partitioned block in the list of neighboring blocks of the smaller sub-block, omitting the larger sub-block of the unequally-sized partitioned block from the list of neighboring blocks of the smaller sub-block, and omitting a neighboring block adjacent to a shorter side of the smaller sub-block, the neighboring block failing to be smaller sub-block of an unequally-sized partitioned block, from the list of neighboring blocks of the smaller sub-block of the unequally-sized partitioned block.

In a further implementation form of the fourth aspect, the sub-block being decoded is a smaller sub-block of the unequally-sized partitioned block, and the method further comprises including a neighboring block of the unequally-sized partitioned block in the list of neighboring blocks of the smaller sub-block, the neighboring block being a smaller sub-block of an unequally-sized portioned block, omitting a larger sub-block of the of the unequally partitioned block when the smaller sub-block is not aligned with left or top side of the unequally partitioned sub-block, and omitting a neighboring block of the unequally-sized partitioned block from the list of neighboring blocks of the smaller sub-block, the neighboring block, the neighboring block being a larger sub-block of an unequally-sized partitioning block.

In a further implementation form of the fourth aspect, the unequally-sized partitioning comprises one of an asymmetric partitioning and a triple-tree partitioning.

According to a fifth aspect, there is provided a computer program comprising a program code configured to perform a method according to the third or fourth aspect, when the computer program is executed on a computing device.

According to a sixth aspect, there is provided a computer-readable medium comprising a computer program comprising a program code configured to perform a method according to the third or fourth aspect, when the computer program is executed on a computing device.

BRIEF DESCRIPTION OF THE DRAWINGS

In the following exemplary embodiments are described in more detail with reference to the attached figures and drawings, in which:

FIG. 4 illustrates a block diagram of encoding and decoding picture data.

FIG. 5A is an illustration of a hierarchically quad-tree partitioned block.

FIG. 5B illustrates split depth of a hierarchically quad-tree partitioned block.

FIG. 5C is an illustration of a quad-tree partitioned block.

FIG. 5D illustrates split depth of a quad-tree partitioned block.

FIG. 5E is an illustration of a binary-tree partitioned block.

FIG. 5F illustrates split depth of a binary-tree partitioned block.

FIG. 5G is an illustration of an asymmetrically partitioned block.

Figure 1:
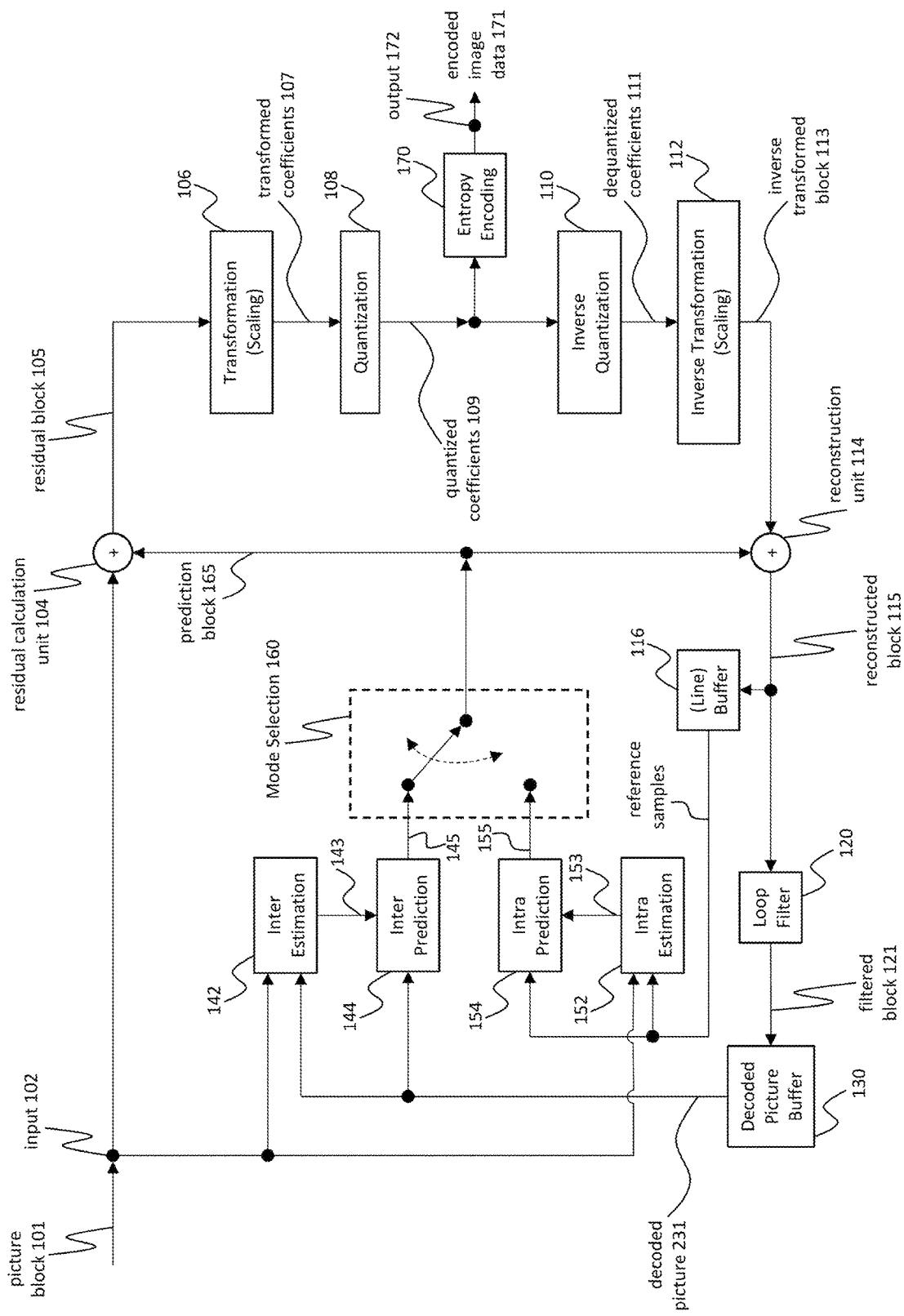
FIG. 1 illustrates a block diagram showing an exemplary structure of a video encoder.

In the following identical reference signs refer to identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present embodiments may be placed. It is understood that other aspects may be utilized and structural or logical changes may be made without departing from the scope of the present embodiments. The following detailed description, therefore, is not to be taken in a limiting sense, as the scope of the present embodiments are defined be the appended claims.

For instance, it is understood that a disclosure in connection with a described method may also hold true for a corresponding device or system configured to perform the method and vice versa. For example, if a specific method step is described, a corresponding device may include a unit or other means to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various exemplary aspects described herein may be combined with each other, unless specifically noted otherwise.

Picture coding typically refers to the processing of a picture, and video coding typically refers to the processing of a sequence of pictures, which form the video or video sequence. Instead of the term picture the terms image or frame may be used/are used synonymously in the field of video coding. Each picture is typically partitioned into a set of non-overlapping blocks. The encoding/coding of the video is typically performed on a block level where e.g. inter-frame prediction or intra-frame prediction are used to generate a prediction block, to subtract the prediction block from the current block (block currently processed/to be processed) to obtain a residual block, which is further transformed and quantized to reduce the amount of data to be transmitted (compression) whereas at the decoder side the inverse processing is applied to the encoded/compressed block to reconstruct the block (video block) for representation.

A picture coding method may exploit a splitting depth of neighboring branches of a partitioning tree to derive the context model for entropy encoder that are applied to encode split flags. For an equally-sized partitioning type a sub-block size follows immediately from its splitting depth. This is not true when a partitioning tree comprises several partitioning types, especially when at least one of these types is of an unequally-sized partitioning type, i.e. a partition is split into sub-blocks having different sizes. Unequally-sized partitioning may be beneficial for video coding because of its better spatial localization of picture regions having redundancy of similar type (e.g. pixel directional and spatial correlation, inter-frame pixel correlation, similar textural features, etc.). An unequal block split can be used as an indicator of difference in pixel statistics within smaller and larger sub-blocks. Evidently, it may not be beneficial to use inappropriate statistics for context modeling. The disclosed solution makes use of the fact that a block to be coded is of the unequally-sized partitioning type in order to perform a proper context modeling for entropy coding of split flags. The disclosed solution is applicable, for example, for motion picture encoding and decoding processes that use hierarchical (tree-based) partitioning schemes with equal and unequal block partitioning.

Covering a picture with a set of blocks is referred to as partitioning. If blocks are of the same size, partitioning is considered to be regular. Hierarchical partitioning consists in splitting a block into smaller sub-blocks. Each of these sub-blocks could be further partitioned up to the smallest size possible. In the HEVC standard picture is regularly split into the largest coding units (LCUs), each of these units could be further hierarchically partitioned. Encoding and parsing processes for hierarchically partitioned blocks are recursive procedures, wherein a recursion step could be represented by a node of a tree structure.

In the following exemplary embodiments of an encoder 100 and a decoder 200 are described based on FIGS. 1 and 2.

FIG. 1 shows an encoder 100, which comprises an input 102, a residual calculation unit 104, a transformation unit 106, a quantization unit 108, an inverse quantization unit 110, and inverse transformation unit 112, a reconstruction unit 114, a loop filter 120, a frame buffer 130, an inter estimation unit 142, an inter prediction unit 144, an intra estimation unit 152, an intra prediction unit 154, a mode selection unit 160, an entropy encoding unit 170, and an output 172.

The input 102 may be configured to receive a picture block 101 of a picture (e.g. a still picture or picture of a sequence of pictures forming a video or video sequence). The picture block may also be referred to as current picture block or picture block to be coded, and the picture as current picture or picture to be coded.

The residual calculation unit 104 is configured to calculate a residual block 105 based on the picture block 101 and a prediction block 165 (further details about the prediction block 165 are provided later), e.g. by subtracting sample values of the prediction block 165 from sample values of the picture block 101, sample by sample (pixel by pixel) to obtain a residual block in the sample domain.

The transformation unit 106 is configured to apply a transformation, e.g. a discrete cosine transform (DCT) or discrete sine transform (DST), on the residual block 105 to obtain transformed coefficients 107 in a transform domain. The transformed coefficients 107 may also be referred to as transformed residual coefficients and represent the residual block 105 in the transform domain.

The quantization unit 108 is configured to quantize the transformed coefficients 107 to obtain quantized coefficients 109, e.g. by applying scalar quantization or vector quantization. The quantized coefficients 109 may also be referred to as quantized residual coefficients 109.

The inverse quantization unit 110 is configured to apply the inverse quantization of the quantization unit 108 on the quantized coefficients to obtain dequantized coefficients 111. The dequantized coefficients 111 may also be referred to as dequantized residual coefficients 111.

The inverse transformation unit 112 is configured to apply the inverse transformation of the transformation applied by the transformation unit 106, e.g. an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g. by sample wise adding the sample values of the decoded residual block 113 and the sample values of the prediction block 165.

The buffer unit 116 (or short "buffer" 116), e.g. a line buffer 116, is configured to buffer or store the reconstructed block, e.g. for intra estimation and/or intra prediction.

The loop filter unit 120 (or short "loop filter" 120), is configured to filter the reconstructed block 115 to obtain a filtered block 121, e.g. by applying a de-blocking sample-adaptive offset (SAO) filter or other filters. The filtered block 121 may also be referred to as filtered reconstructed block 121.

Embodiments of the loop filter unit 120 may comprise (not shown in FIG. 1) a filter analysis unit and the actual filter unit, wherein the filter analysis unit is configured to determine loop filter parameters for the actual filter.

Embodiments of the loop filter unit 120 may comprise (not shown in FIG. 1) one or a plurality of filters, e.g. one or more of different kinds or types of filters, e.g. connected in series or in parallel or in any combination thereof, wherein each of the filters may comprise individually or jointly with other filters of the plurality of filters a filter analysis unit to determine the respective loop filter parameters.

Embodiments of the loop filter unit 120 may be configured to provide the loop filter parameters to the entropy encoding unit 170, e.g. for entropy encoding and transmission.

The decoded picture buffer 130 is configured to receive and store the filtered block 121 and other previous filtered blocks, e.g. previously reconstructed and filtered blocks 121, of the same current picture or of different pictures, e.g. previously reconstructed pictures, e.g. for inter estimation and/or inter prediction.

The inter estimation unit 142, also referred to as inter picture estimation unit 142, is configured to receive the picture block 101 (current picture block of a current picture) and one or a plurality of previously reconstructed blocks, e.g. reconstructed blocks of one or a plurality of other/different previously decoded pictures 231, for inter estimation (or "inter picture estimation"). E.g. a video sequence may comprise the current picture and the previously decoded pictures 231, or in other words, the current picture and the previously decoded pictures 231 may be part of or form a sequence of pictures forming a video sequence.

The encoder 100 may, e.g., be configured to obtain a reference block from a plurality of reference blocks of the same or different pictures of the plurality of other pictures and provide a reference picture (or reference picture index)

and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to receive an inter prediction parameter 143 and to perform inter estimation based on/using the inter prediction parameter 143 to obtain an inter prediction block 145.

The intra estimation unit 152 is configured to receive the picture block 101 (current picture block) and one or a plurality of previously reconstructed blocks, e.g. reconstructed neighbor blocks, of the same picture for intra estimation. The encoder 100 may, e.g., be configured to obtain an intra prediction mode from a plurality of intra prediction modes and provide it as intra estimation parameter 153 to the intra prediction unit 154.

Embodiments of the encoder 100 may be configured to select the intra-prediction mode based on an optimization criterion, e.g. minimum residual (e.g. the intra-prediction mode providing the prediction block 155 most similar to the current picture block 101) or minimum rate distortion.

The intra prediction unit 154 is configured to determine based on the intra prediction parameter 153, e.g. the selected intra prediction mode 153, the intra prediction block 155.

Although FIG. 1 shows two distinct units (or steps) for the intra-coding, namely intra estimation 152 and intra prediction 154, both functionalities may be performed as one (intra estimation may requires calculating the intra prediction block), e.g. by testing all possible or a predetermined subset of possible intra-prediction modes iteratively while storing the currently best intra prediction mode and respective intra prediction block, and using the currently best intra prediction mode and respective intra prediction block as the (final) intra prediction parameter 153 and intra prediction block 155 without performing another time the intra prediction 154.

Mode selection unit 160 may be configured to perform inter estimation/prediction and intra estimation/prediction) and to select a reference block and/or prediction mode (intra or inter prediction mode) to be used as prediction block 165 for the calculation of the residual block 105 and for the reconstruction of the reconstructed block 115.

Embodiments of the mode selection unit 160 may be configured to select the prediction mode, which provides the minimum residual (minimum residual means better compression), or a minimum signaling overhead, or both. The mode selection unit 160 may be configured to determine the prediction mode based on rate distortion optimization (RDO).

The entropy encoding unit 170 is configured to apply an entropy encoding algorithm on the quantized residual coefficients 109, inter prediction parameters 143, intra prediction parameter 153, and/or loop filter parameters, individually or jointly (or not at all) to obtain encoded picture data 171 which can be output by the output 172, e.g. in the form of an encoded bit stream 171.

Embodiments of the encoder 100 may be configured such that, e.g. the buffer unit 116 is not only used for storing the reconstructed blocks 115 for intra estimation 152 and/or intra prediction 154 but also for the loop filter unit 120 (not shown in FIG. 1), and/or such that, e.g. the buffer unit 116 and the decoded picture buffer unit 130 form one buffer. Further embodiments may be configured to use filtered blocks 121 and/or blocks or samples from the decoded picture buffer 130 (both not shown in FIG. 1) as input or basis for intra estimation 152 and/or intra prediction 154.

Embodiments of the encoder 100 may comprise a picture partitioning unit to partition a picture into a set of typically non-overlapping blocks before processing the picture further. Accordingly, embodiments of the encoder 100 may comprise an input 102 configured to receive blocks (video blocks) of pictures of a video sequence (video stream). Pictures may comprise M×N pixels (horizontal dimension× vertical dimension) and the blocks may comprise m×n pixels (horizontal dimension×vertical dimension), and the picture may have a square dimension of m×n pixels.

The term "pixels" corresponds to picture samples, wherein each of the pixels/samples may comprise one or more color components. For the sake of simplicity, the following description refers to pixels/samples meaning samples of luminance. However, it is noted that the processing of coding blocks of the invention can be applied to any color component including chrominance or components of a color space such as RGP or the like. On the other hand, it may be beneficial to perform motion vector estimation for only one component and to apply the results of the processing to more (or all) components.

Embodiments of the encoder 100 may be adapted to use the same block size for all pictures of a video sequence or to change the block size and the corresponding grid defining the block size and partitioning the picture into the corresponding blocks per picture or a subset of pictures.

For partitioning the pictures into blocks, embodiments of the encoder 100 may comprise a picture partitioning unit (not depicted in FIG. 1).

Figure 2:
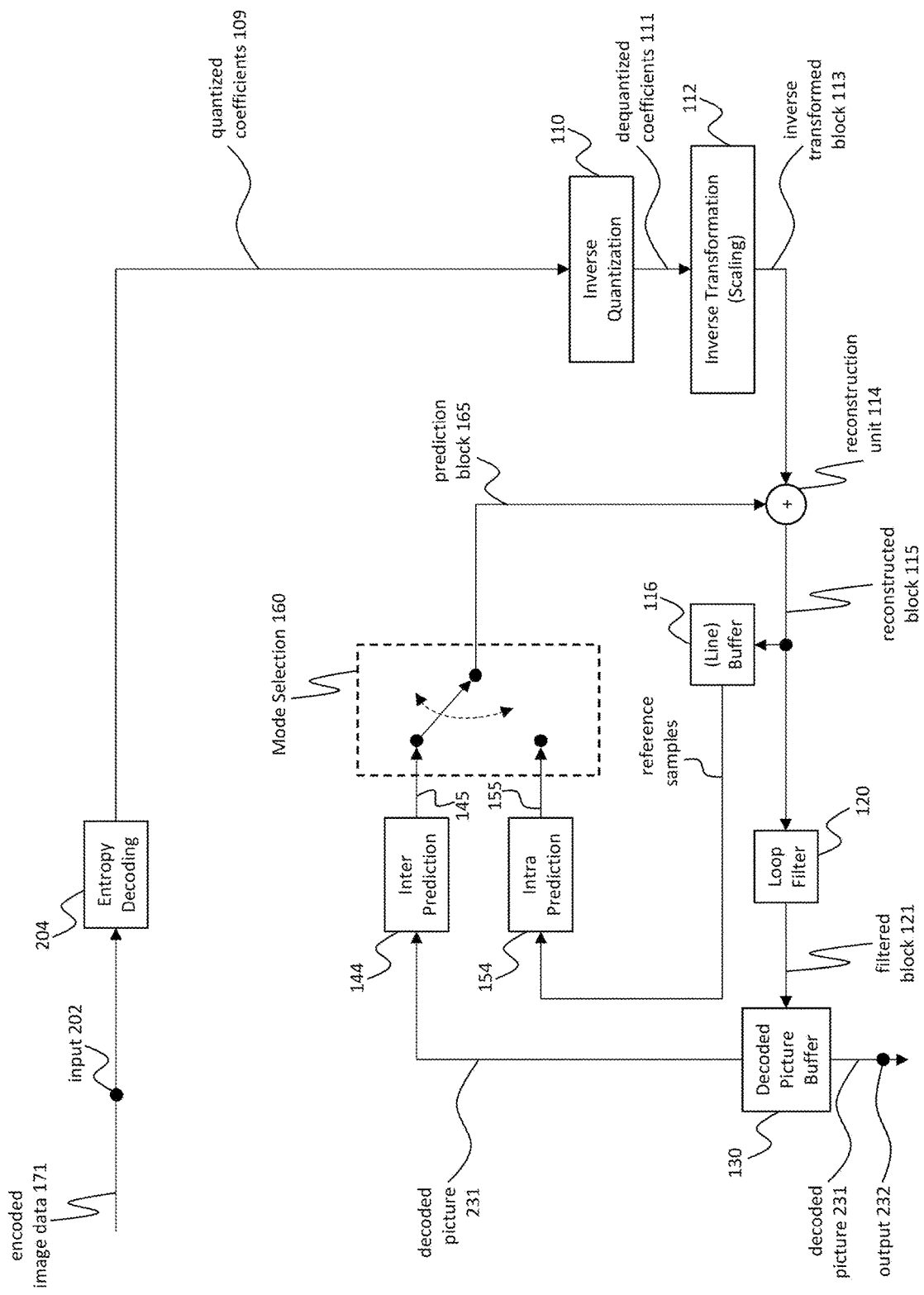
FIG. 2 illustrates a block diagram showing an exemplary structure of a video decoder.

FIG. 2 shows an exemplary video decoder 200 configured to receive an encoded picture data (bit stream) 171, e.g. encoded by encoder 100, to obtain a decoded picture 231. The decoder 200 comprises an input 202, an entropy decoding unit 204, an inverse quantization unit 110, an inverse transformation unit 112, a reconstruction unit 114, a buffer 116, a loop filter 120, a decoded picture buffer 130, an inter prediction unit 144, an intra prediction unit 154, a mode selection unit 160 and an output 232. Discussion of references that are identical with references in FIG. 1 is not repeated here, reference is made to the description of FIG. 1.

Accordingly, FIG. 1 and FIG. 2 illustrate examples of picture coding apparatuses. The picture coding apparatus may be a picture encoding apparatus, such as the video encoder 100 of FIG. 1, or the picture coding apparatus may be a picture decoding apparatus, such as the video decoder 200 of FIG. 2.

The picture decoding apparatus 200 may be configured to receive a bit stream, i.e. encoded image data 171, at the input 202.

The picture coding apparatus 100 or 200 may be configured to hierarchically partition a block of picture data into sub-blocks. The partitioning may be implemented by a picture partitioning unit (not shown in FIGS. 1 and 2) included in the picture coding apparatus 100 or 200. If blocks are of the same size, partitioning is considered to be regular. Hierarchical partitioning consists in splitting a block into smaller sub-blocks. Each of these sub-blocks could be further partitioned up to the smallest size possible. If unequally-sized partitioning or asymmetric partitioning is used, blocks having different sizes are achieved. Here, the terms "smaller" and "larger" indicate that a side-length of a smaller sub-block of picture data is smaller than the side-length of the larger sub-block of picture data in a direction perpendicular or orthogonal to the direction of the partitioning. In other words, the smaller sub-block may be a first sub-block and the larger sub-block may be a second sub-block, wherein the side-length in the partitioning direction of the first sub-block is smaller than the side-length in the partitioning direction of the second sub-block. For example, when asymmetrical partitioning is performed vertically (i.e. the block is partitioned by a vertical line), the side-length of the smaller sub-block or first sub-block is smaller than the side-length of the larger sub-block or second sub-block in a horizontal direction, and vice versa. In an analogue manner, if the asymmetrical partitioning is performed horizontally (i.e. the block is partitioned by a horizontal line), the partitioning direction will be the vertical direction and the side length of the first sub-block (smaller sub-block) will be smaller than the side-length of the second sub-block (larger sub-block) in the vertical direction. In this disclosure the terms first sub-block and second sub-block are not meant to limit the hierarchy, importance, sequence or position in the block of the sub-blocks.

The picture coding apparatus 100 or 200 may be configured to determine that a sub-block being coded is a sub-block of an unequally-sized partitioned block. The determining may be implemented by a picture partitioning unit (not shown in FIGS. 1 and 2) included in the picture coding apparatus 100 or 200 as a part of entropy encoding 170 and entropy decoding 204.

The picture coding apparatus 100 or 200 may be configured to prepare a list of neighboring blocks for the sub-block of the unequally-sized partitioned block based on a size of the sub-block of the unequally-sized partitioned block and a partitioning type of at least one neighboring block of the unequally-sized partitioned block. The preparing may be implemented by the entropy encoder 170 and the entropy decoder 204.

The picture encoding apparatus 100 may be configured to apply the prepared list of neighboring blocks in deriving a context model that is used to encode split information into a bit stream. In other words the picture encoding apparatus 100 may be configured to derive a context model used to encode split information into a bit stream based on the prepared list of the neighboring blocks. The derivation of the context model may be implemented by the entropy encoder 170. Similarly, the picture decoding apparatus 200 may be configured to apply the prepared list of neighboring blocks in deriving a context model that is used to decode split information from the bit stream. In other words, the picture decoding apparatus 200 may be configured to derive a context model that is used to decode split information from the bit stream by applying the prepared list of neighboring blocks.

In embodiments of the invention, unequally-sized partitioning comprises one of an asymmetric partitioning and a triple-tree partitioning.

Figure 3A:
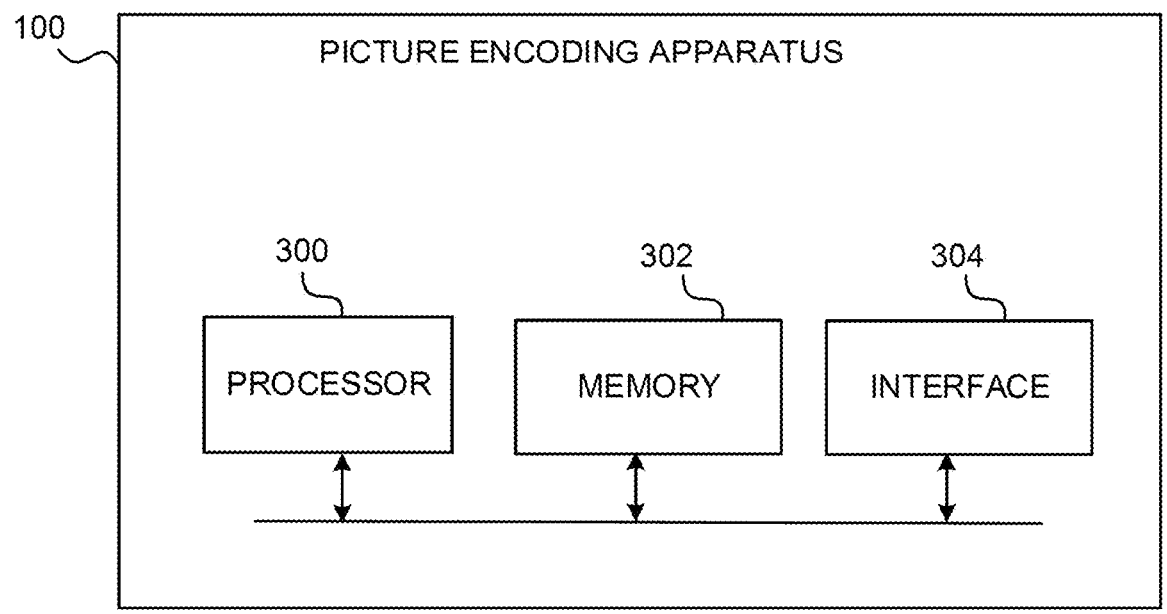
FIG. 3A illustrates is a block diagram of a picture encoding apparatus.

FIG. 3A illustrates a further example of the picture encoding apparatus 100 of FIG. 1. The picture encoding apparatus 100 may comprise a processor or a processing circuitry or processors 300, a memory or memories 302 and/or an input/output interface 304. The processor 300 may be adapted to perform the functions of one or more of the residual calculation unit 104, transformation unit 106, quantization unit 108, inverse quantization unit 110, inverse transformation unit 112, reconstruction unit 114, loop filter 120, inter estimation unit 142, inter prediction unit 144, intra estimation unit 152, intra prediction unit 154, mode selection unit 160, or entropy encoding unit 170. The input/output interface 304 may be adapted to perform the functions of one or more of the input 102 or output 172. The memory 302 may be adapted to perform the functions of one or more of the buffer 116 or the frame buffer 130.

Figure 3B:
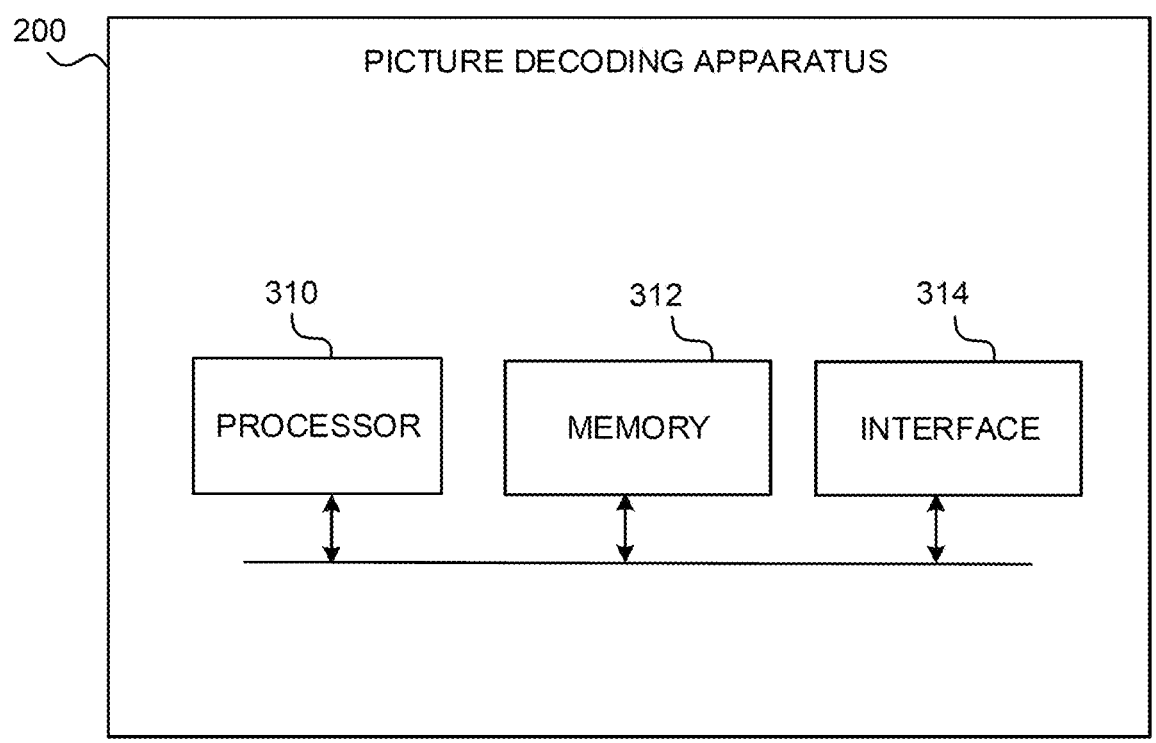
FIG. 3B illustrates a block diagram of a picture encoding apparatus.

FIG. 3B illustrates a further example of the picture decoding apparatus 200 of FIG. 2. The picture decoding apparatus 200 may comprise a processor or a processing circuitry or processors 310, a memory or memories 302 and/or an input/output interface 304. The processor 300 may be adapted to perform the functions of one or more of the entropy decoding unit 204, inverse quantization unit 110, inverse transformation unit 112, reconstruction unit 114, loop filter 120, inter prediction unit 144, intra prediction unit 154, or mode selection unit 160. The input/output interface 314 may be adapted to perform the functions of one or more of the input 202 or output 232. The memory 312 may be adapted to perform the functions of one or more of the buffer 116 or decoded picture buffer 130.

FIG. 4 illustrates a block diagram of encoding and decoding picture data. A hierarchical encoder 402 generates from an original picture 400 various syntax elements that are further signaled into a bit stream 408 according to an assigned probability model. The syntax elements comprise data that represents how a picture is split into blocks. Means of context derivation 404 provides a context index, i.e. a probability model that is used during entropy coding 406. The probability model is derived by the means of context derivation 404 from a syntax element type and values of the previously processed syntax elements. The probability model is used by entropy encoders, such as a context-adaptive binary arithmetic coder (CABAC) or a Huffman encoder in order to transform syntax elements' values into a sequence of bits in step 406.

On the decoder side syntax elements are restored from the bit stream by an entropy decoder 410, which is an operation that transforms an entropy-encoded bit stream into a set of binary values (bins). Means of context derivation 414 ensure that the entropy decoder 410 is assigned the same context models that were assigned on the encoder side. Otherwise, the parsing and decoding processes could not be correctly performed, because wrong values of syntax elements are parsed from the bit stream. As a consequence of this requirement, means of context derivation should not have differences at the encoder and decoder sides (blocks 404 and 414, respectively), i.e. provide the same context models for the same input sequence of syntax elements. The set of bins is utilized by a parser of syntax elements 412 that restores the values of syntax elements from this set of bins. These restored values are passed to the means of context derivation 414 so that entropy decoding could be performed correctly for the next decoded sub-block. A hierarchical decoder 416 reconstructs a sub-block in accordance with the values of corresponding syntax elements provided by the parser of syntax elements 412 and outputs the decoded sub-block pixel data into a reconstructed picture at a spatial position determined by a coding order of the decoded sub-block.

The end result is a reconstructed picture 418 at a receiving side of the transmitted bit stream.

FIG. 5A is an illustration of a hierarchically quad-tree partitioned block. A square block 500 can be divided into four square sub-blocks. In this example, a sub-block with an index "1" at level "A" is further split into four sub-blocks (level "B"), (blocks $B_0$, $B_1$, $B_2$ and $B_3$). This type of partitioning is called quad-tree partitioning and may be used, for example, in HEVC to perform LCU (Largest Coding Unit) partitioning.

FIG. 5B illustrates split depth of a hierarchically quad-tree partitioned block of FIG. 5A. Each of the nodes of a tree shown in FIG. 5B corresponds to its square block of the hierarchically partitioned block "X" 502 of FIG. 5A. There is only one possible way to cover a square block by four equally-sized square blocks. Hence, encoding split decisions for each of the nodes of this tree is enough to restore partitioning structure at a decoding side. Each node within a tree-based representation has its split depth, i.e. a number of nodes in the path from this node to the root of the tree. These split decisions are encoded by syntax elements referred to as "split flags".

FIG. 5C is an illustration of a quad-tree partitioned block. A square block 504 can be divided into four square sub-blocks $A_0$, $A_1$, $A_2$ and $A_3$. This type of partitioning is called quad-tree partitioning and may be used, for example, in the HEVC to perform Largest Coding Unit (LCU) partitioning.

FIG. 5D illustrates split depth of a quad-tree partitioned block of FIG. 5C. Each of the nodes of a tree shown in FIG. 5D corresponds to its square block of the partitioned block "X" 504 of FIG. 5C. There is only one possible way to cover a square block by four equally-sized square blocks. Hence, encoding split decisions for each of the nodes of this tree is enough to restore partitioning structure at a decoding side. These split decisions are encoded by syntax elements referred to as "split flags". Each node within a tree-based representation has its split depth, i.e. a number of nodes in the path from this node to the root of the tree.

FIG. 5E is an illustration of a binary-tree partitioned block. A square block 508 can be divided into two equally sized rectangular sub-blocks $A_0$ and $A_1$. As it can be seen from FIG. 5E, there are two ways to cover block 508 by equally-sized rectangles, a vertical split 512 or a horizontal split 510.

FIG. 5F illustrates split depth of a binary-tree partitioned block. Each of the nodes of a tree shown in FIG. 5F corresponds to its square block of the partitioned block "X" 508 of FIG. 5E. In the case of a binary-tree partitioned block, it is not enough to signal split decisions. A split direction should be also signaled for a block being partitioned (block "X" 508 in FIG. 5E).

FIG. 5G is an illustration of an asymmetrically partitioned block. In asymmetric partitioning a block 514 is split into two unequally-sized rectangles. As can be seen from FIG. 5G, it is possible to split the block 514 into four different layouts of two unequally-sized sub-blocks 516, 518, 520, 522 depending on the splitting direction and locations of the sub-blocks. Besides the split direction it is also necessary to signal the layout of a smaller and a larger sub-lock within a block.

Figure 5H:
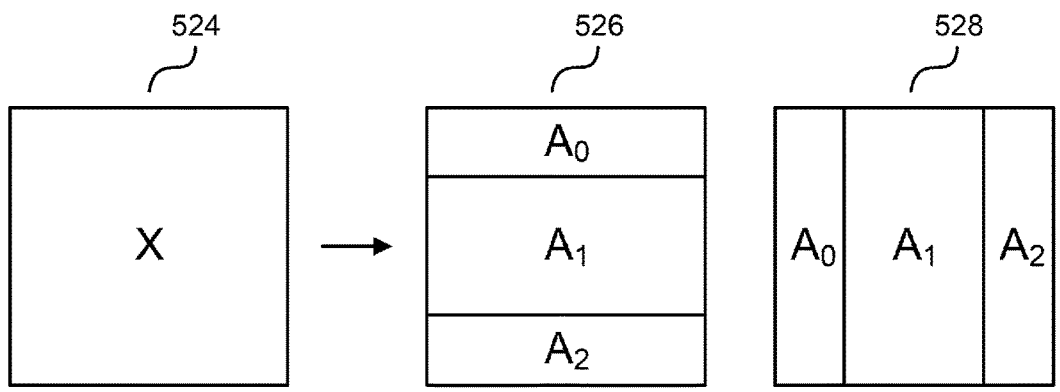
FIG. 5H is an illustration of a triple-tree partitioned block.

FIG. 5H is an illustration of a triple-tree partitioned block. In triple-tree partitioning, a block 524 is divided into three sub-blocks. The triple-tree partitioning type is similar to the binary tree partitioning, but it consists of three sub-blocks, and one of the sub-blocks is larger than the other two sub-blocks. As in the case of the binary tree partitioning, also in the triple-tree partitioning it is necessary to signal whether split direction is a horizontal split 526 or a vertical split 528.

All the different partitioning types discussed in FIGS. 5A-5H can be combined within a multiple-type tree (MTT). Depending on the partitioning type of a node, besides split flags, different additional syntax elements may be signaled from an encoder to a decoder.

Figures 6A, 6B:
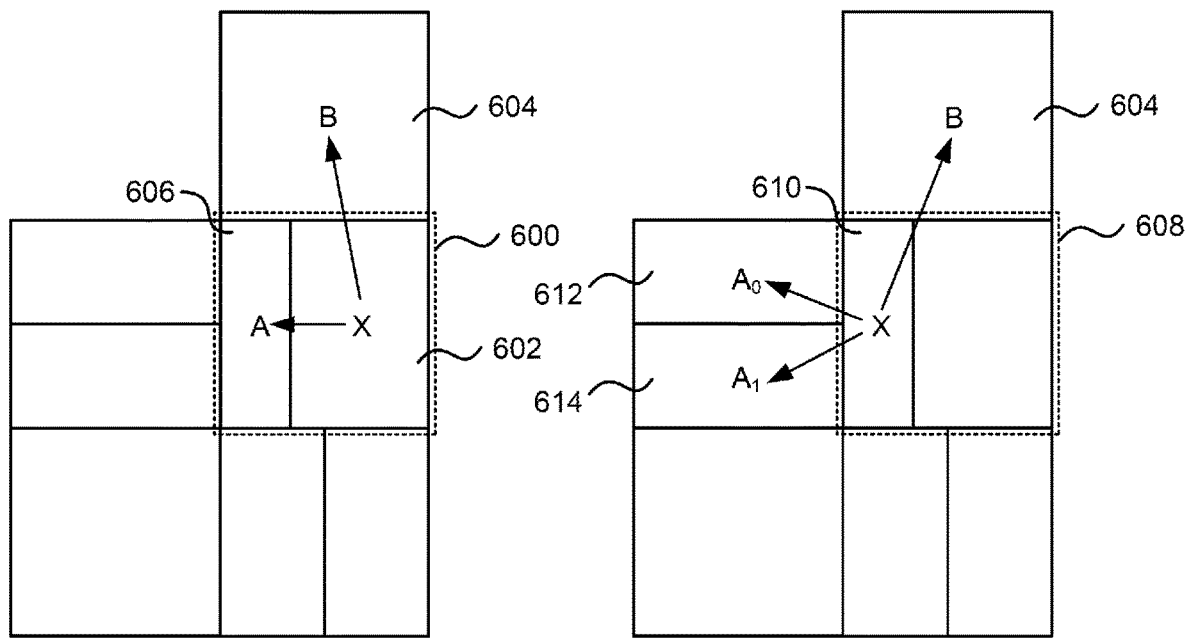
FIG. 6A is an illustration of a quad-tree plus binary tree (QTBT) asymmetric partition (AP) node.
FIG. 6B is another illustration of a quad-tree plus binary tree (QTBT) asymmetric partition (AP) node.

FIG. 6A is an illustration of a quad-tree plus binary tree (QTBT) asymmetric partition (AP) node 600. FIG. 6A illustrates a way for determining which neighboring blocks are relevant, i.e. included in a list of neighboring blocks of a sub-block being encoded or decoded. When encoding a block X 602 of the QTBT AP node 600, neighboring blocks A 606 on the left side of the block 602 and a block B 604 above of the block 602 are included in the list of neighboring blocks for the block X 602. A drawback in the example illustrated in FIG. 6A is that the block 606 has another partitioning scheme that influences on context selection for the block X 602.

FIG. 6B is another illustration of a quad-tree plus binary tree (QTBT) asymmetric partition (AP) node 608. FIG. 6B illustrates a known way for determining which neighboring blocks are relevant, i.e. included in a list of neighboring blocks of a sub-block being encoded or decoded. When encoding a block X 610 of the QTBT AP node 608, neighboring blocks $A_1$ 612 and $A_2$ 614 on the left side of the block 608 and a block B 604 above of the block 608 are included in the list of neighboring blocks for the block X 610. A drawback in the example illustrated in FIG. 6B is that one side of the block X 610 is always shorter than the other side of the block X 610. This leads to selection of irrelevant neighboring blocks on the shorter side of the block X 610, thus adversely affecting context selection for the block X 610.

Figure 7:
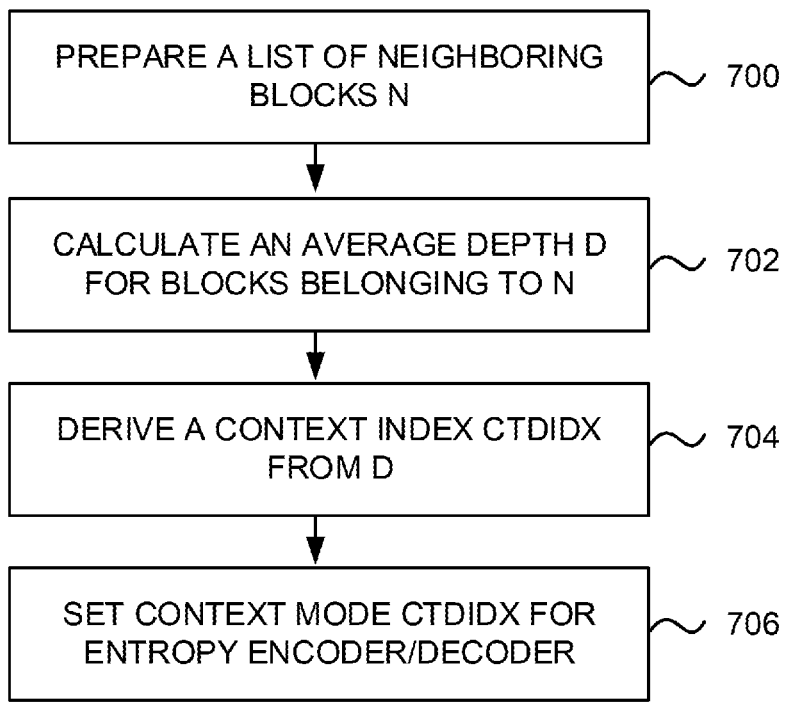
FIG. 7 illustrates a flow diagram of a context index derivation process for split flag coding.

FIG. 7 illustrates a flow diagram of a context index derivation process for split flag coding for a block. The process illustrated in FIG. 7 is performed to signal a split decision for a given block. At 700, a list of blocks that are neighboring to the block being encoded is prepared. For example, in the existing HEVC solution only two neighboring blocks are considered: one should be located above the current block and the other one should be located to the left of the block being encoded. Instead, at 700 a list of neighboring blocks N is prepared taking into account that the block being encoded is of the unequally-sized partitioning type. The fact that a block is split unequally indicates that content is different within a larger and a smaller partitions of the block. This difference makes it more beneficial to select more distant blocks than just the adjacent ones. Thus, the list of neighbors is prepared differently when unequally-sized partitioning is performed.

At 702, average split depth of the neighboring blocks is calculated. This can be performed in several ways. For example, an average depth could be calculated relatively to the depth of the block being split, and is expressed as three possible cases for the two given neighboring blocks:

A current block split depth value is equal or greater than the split depth values of any of the neighboring blocks;

A current block split depth value is equal or greater than the split depth value of one of the neighboring blocks but is smaller than of the other neighboring block;

A current block split depth value is smaller than the split depth values of any of the neighboring blocks.

There are many other ways to calculate average depth value for the list of neighboring block, for example, by selecting a minimum or maximum split depth value, calculating an arithmetic and geometric mean values, etc. In an embodiment, the average depth calculation always considers the split depth of the current block.

At 704 a context model is selected based on the average depth value. This may require that a list of contexts is already specified (either pre-defined or generated adaptively) and consist in selecting a single context out of the list in accordance with the average depth value calculated at 702.

At 706 a context switch of an entropy encoder (when encoding a picture) or an entropy decoder (when decoding a picture) is set to the context model determined at 704.

Figure 8A:
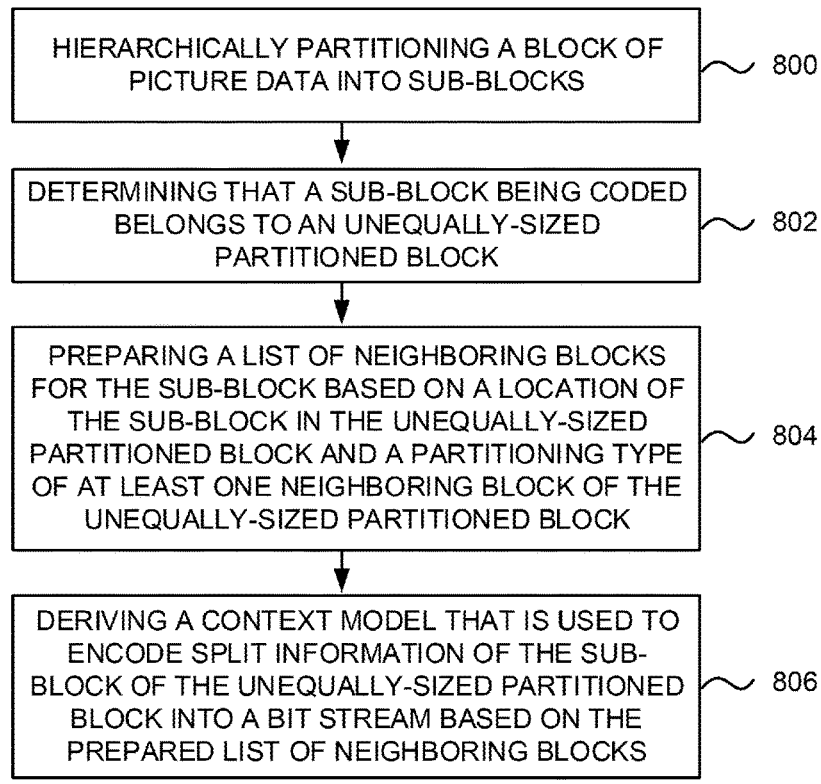
FIG. 8A illustrates a flow diagram for encoding a picture.

FIG. 8A illustrates a flow diagram for encoding a picture. At 800, block of picture data is hierarchically partitioned into sub-blocks. Hierarchical partitioning consists in splitting a block into smaller sub-blocks. At 802 it is determined that a sub-block being coded belongs to an unequally-sized partitioned block. The determination has an effect that a list of neighboring blocks for the sub-block being coded is generated in a different manner than, for example, just automatically including adjacent neighboring blocks of the sub-block in the list of neighboring blocks. At 804 the list of neighboring blocks for the sub-block of the unequally-sized partitioned block is prepared based on a size of the sub-block of the unequally-sized partitioned block and a partitioning type of at least one neighboring block of the unequally-sized partitioned block. This may mean, for example, that when considering a larger sub-block of the unequally-sized partitioned block, the adjacent smaller sub-block of the unequally-sized partitioned block is not included in the list of neighboring blocks for the larger sub-block. Instead, at least one adjacent neighboring blocks unequally-sized partitioned block may be included in the list of neighboring blocks for the larger sub-block. Thus more distant neighboring blocks can be taken into account when preparing the list of neighboring blocks. At 806 a context model that is used to encode split information of the sub-block of the unequally-sized partitioned block into a bit stream is derived based on the prepared list of neighboring block. The illustrated method may be implemented by the encoder illustrated in FIG. 1 or the picture encoding apparatus illustrated in FIG. 3A. When preparing and applying the list of neighboring blocks as illustrated above, coding rate-distortion performance is improved. Further, no significant hardware redesigns are needed.

Figure 8B:
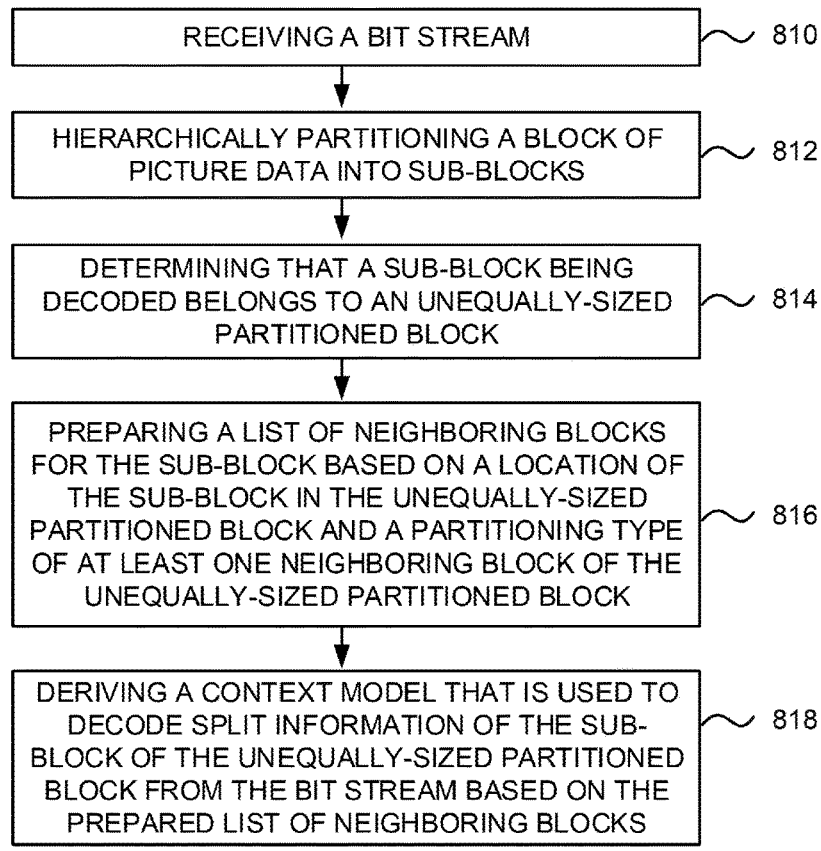
FIG. 8B illustrates a flow diagram for decoding a picture.

FIG. 8B illustrates a flow diagram for decoding a picture. At 810 a bit stream is received. The bit stream may comprise encoded picture data. At 812, block of picture data is hierarchically partitioned into sub-blocks. Hierarchical partitioning consists in splitting a block into smaller sub-blocks. At 814 it is determined that a sub-block being decoded belongs to an unequally-sized partitioned block. The determination has an effect that a list of neighboring blocks for the sub-block being decoded is generated in a different manner than, for example, just automatically including adjacent neighboring blocks of the sub-block in the list of neighboring blocks. At 816 the list of neighboring blocks for the sub-block of the unequally-sized partitioned block is prepared based on a size of the sub-block of the unequally-sized partitioned block and a partitioning type of at least one neighboring block of the unequally-sized partitioned block. This may mean, for example, that when considering a larger sub-block of the unequally-sized partitioned block, the adjacent smaller sub-block of the unequally-sized partitioned block is not included in the list of neighboring blocks for the larger sub-block. Instead, at least one adjacent neighboring blocks unequally-sized partitioned block may be included in the list of neighboring blocks for the larger sub-block. Thus more distant neighboring blocks can be taken into account when preparing the list of neighboring blocks. At 818 a context model that is used to decode split information of the sub-block of the unequally-sized partitioned block from the bit stream is derived based on the prepared list of neighboring blocks. The illustrated method may be implemented by the decoder illustrated in FIG. 2 or the picture decoding apparatus illustrated in FIG. 3B. When preparing and applying the list of neighboring blocks as illustrated above, coding rate-distortion performance is improved. Further, no significant hardware redesigns are needed.

A partitioning block structure is well correlated with the picture content. Textures and edges of depicted objects are enclosed within blocks of smaller size, while homogenous areas are represented by larger blocks. When a node is partitioned into equally-sized sub-blocks, the probability of an edge or a texture is almost equal for any of these sub-blocks if not considering partitioning of blocks neighboring to the node. As disclosed above at 702, the fact of unequal partitioning can be utilized to determine this probability. Smaller sub-blocks have higher probability of containing an edge or a texture than larger ones. When performing context derivation to encode split flags, sub-blocks can be divided into two (or even several) types in such a manner that a block of certain type uses neighbors of the same type to derive context model for its split flag. This may provide a more reliable way to predict split occurrence of a block by removing irrelevant statistics from context modeling that was inferred by irrelevant neighboring blocks.

Figure 9A:
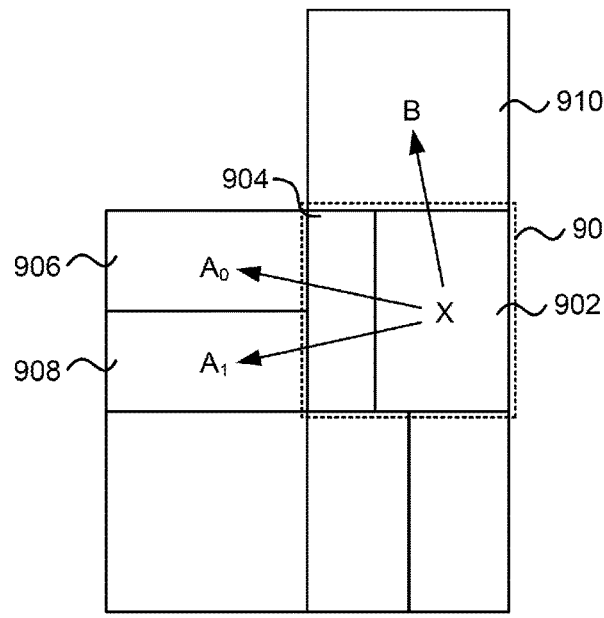
FIG. 9A is an illustration of a vertically partitioned quad-tree plus binary tree (QTBT) asymmetric partition (AP) node.

FIG. 9A is an illustration of a vertically partitioned quad-tree plus binary tree (QTBT) asymmetric partition (AP) node 900. FIG. 9A illustrates an example how to prepare a list of neighboring blocks for a sub-block being coded or decoded. A smaller sub-block 904 of the asymmetrically partitioned node 900 is not included into a list of neighboring blocks when deriving context model for splitting a larger sub-block 902. Instead, neighboring blocks 906, 908, 910 of the entire asymmetrically partitioned node 900 are included into the list of neighboring blocks when deriving a context model for splitting the larger sub-block 902.

Figure 9B:
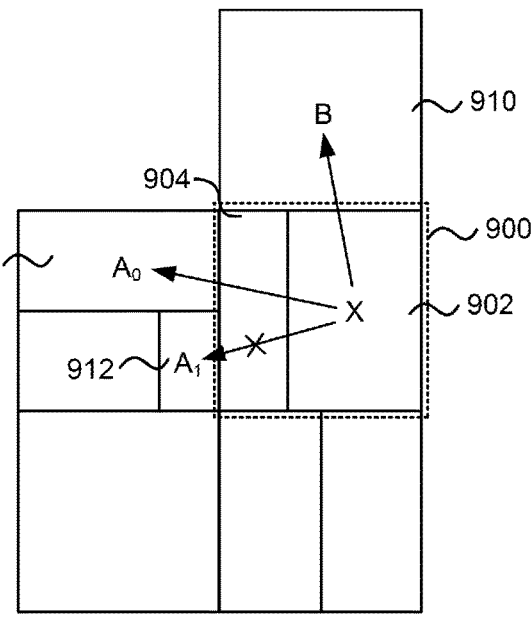
FIG. 9B is another illustration of a vertically partitioned quad-tree plus binary tree (QTBT) asymmetric partition (AP) node.

FIG. 9B is another illustration of a vertically partitioned quad-tree plus binary tree (QTBT) asymmetric partition (AP) node. FIG. 9B illustrates an example how to prepare a list of neighboring blocks for a sub-block being coded or decoded. Again, the smaller sub-block 904 of the asymmetrically partitioned node 900 is not included into a list of neighboring blocks when deriving context model for splitting the larger sub-block 902. The example illustrated in FIG. 9B differs from the example illustrated in FIG. 9A in that the block 908 of FIG. 9A is now asymmetrically partitioned in FIG. 9B. In the example of FIG. 9B, if a block is adjacent to the asymmetrically partitioned node 900 but belongs to a smaller sub-block of unequally-sized partition (for example, an asymmetric partition or a triple-tree partition), it is skipped from being included into the list of neighboring blocks when deriving context model for splitting the larger sub-block 902. In FIG. 9B, a smaller sub-block 912 of an asymmetrically partitioned block is skipped from being included into the list of neighboring blocks when deriving the context model for splitting the larger sub-block 902. The blocks 906 and 910 are still included in the list of neighboring blocks.

Figure 9C:
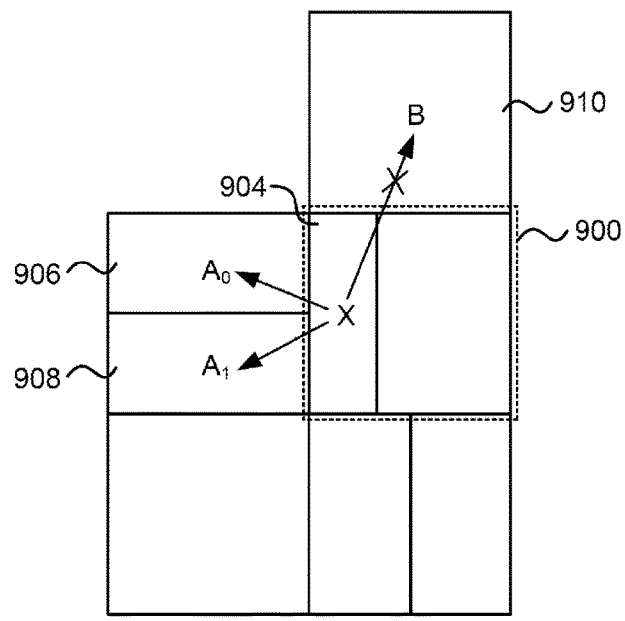
FIG. 9C is another illustration of a vertically partitioned quad-tree plus binary tree (QTBT) asymmetric partition (AP) node.

FIG. 9C is another illustration of a vertically partitioned quad-tree plus binary tree (QTBT) asymmetric partition (AP) node. FIG. 9C illustrates an example how to prepare a list of neighboring blocks for a sub-block being coded or decoded. The neighbor selection for the smaller sub-block 904 also depends on the partitioning type of the nodes to which candidate neighbor blocks belong to. If a candidate neighboring block adjacent to the shorter side of asymmetrically partitioned block does not belong to a smaller sub-block of an unequally partitioned block, such a candidate neighboring block is not included into the list. Thus, the block 910 is not included in the list of neighboring blocks, whereas blocks 906 and 908 are included in the list of neighboring blocks when deriving a context model for splitting the smaller sub-block 904.

Figure 9D:
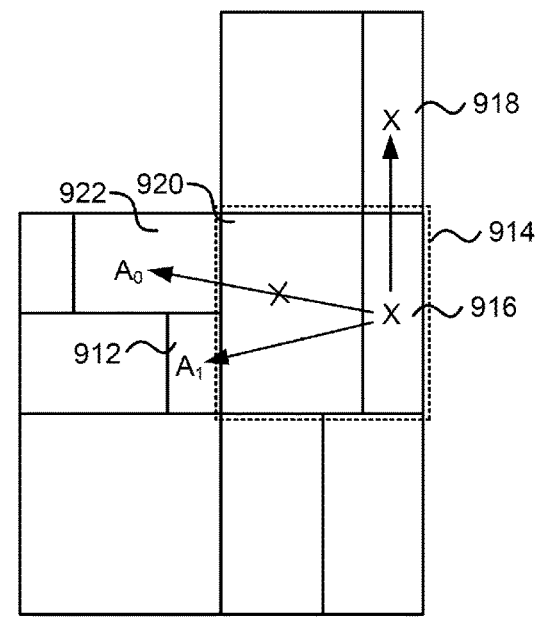
FIG. 9D is another illustration of a vertically partitioned quad-tree plus binary tree (QTBT) asymmetric partition (AP) node.

FIG. 9D is another illustration of a vertically partitioned quad-tree plus binary tree (QTBT) asymmetric partition (AP) node. FIG. 9D illustrates an example how to prepare a list of neighboring blocks for a sub-block being coded or decoded. The example illustrated in FIG. 9D differs from the example illustrated in FIG. 9C in that the blocks 906, 908 of FIG. 9C are now asymmetrically partitioned in FIG. 9D and that a smaller sub-block 916 of the asymmetrically partitioned node 914 is now the rightmost block of the asymmetrically partitioned node 914. If a smaller sub-block is not aligned with the left or top side of the partitioned block, neighboring blocks are selected from the ones adjacent to the asymmetrically partitioned node 914, and a larger sub-block 920 of asymmetrically partitioned node 914 is omitted from the list of neighboring blocks when deriving a context model for splitting the smaller sub-block 916. Moreover, for the case of the smaller sub-block 916, candidate neighboring blocks should either be a result of equally-sized partitioning, or belong to smaller sub-blocks of unequally-sized partitioning. Potential neighboring blocks that are larger sub-blocks of unequally sized partitioning are not included to the list. Thus, the blocks 912 and 918 are included in the list of neighboring blocks whereas a block 922 is omitted from list of neighboring blocks when deriving a context model for splitting the smaller sub-block 916.

Figure 10A:
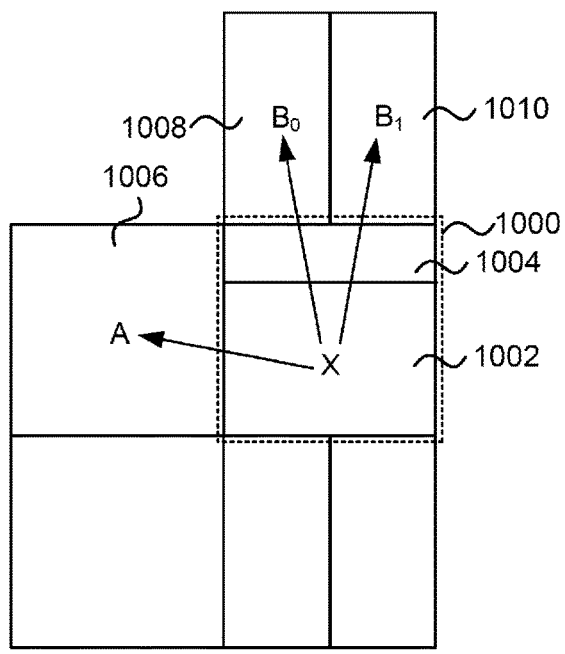
FIG. 10A is an illustration of a horizontally partitioned quad-tree plus binary tree (QTBT) asymmetric partition (AP) node.

FIG. 10A is an illustration of a horizontally partitioned quad-tree plus binary tree (QTBT) asymmetric partition (AP) node. FIG. 10A illustrates an example how to prepare a list of neighboring blocks for a sub-block being coded or decoded. A smaller sub-block 1004 of an asymmetrically partitioned node 1000 is not included into a list of neighboring blocks when deriving context model for splitting a larger sub-block 1002. Instead, neighboring blocks 1006, 1008, 1010 of the entire asymmetrically partitioned node 1000 are included into the list of neighboring blocks when deriving a context model for splitting the larger sub-block 1002.

Figure 10B:
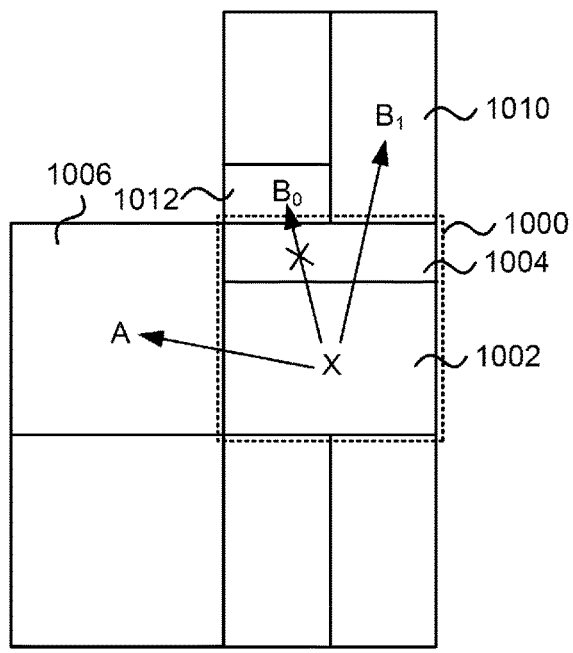
FIG. 10B is another illustration of a horizontally partitioned quad-tree plus binary tree (QTBT) asymmetric partition (AP) node.

FIG. 10B is another illustration of a horizontally partitioned quad-tree plus binary tree (QTBT) asymmetric partition (AP) node. FIG. 10B illustrates an example how to prepare a list of neighboring blocks for a sub-block being coded or decoded. The example illustrated in FIG. 10B differs from the example illustrated in FIG. 10A in that the block 1008 of FIG. 10A is now asymmetrically partitioned in FIG. 10B. In the example of FIG. 10B, if a block is adjacent to the asymmetrically partitioned node 1000 but belongs to a smaller sub-block of unequally-sized partition (for example, an asymmetric partition or a triple-tree partition), it is skipped from being included into the list of neighboring blocks when deriving context model for splitting the larger sub-block 1002. In FIG. 10B, the smaller sub-block 1004 of the asymmetrically partitioned block 1000 is skipped from being included into the list of neighboring blocks when deriving the context model for splitting the larger sub-block 1002. The blocks 1006 and 1010 are still included in the list of neighboring blocks.

Figure 10C:
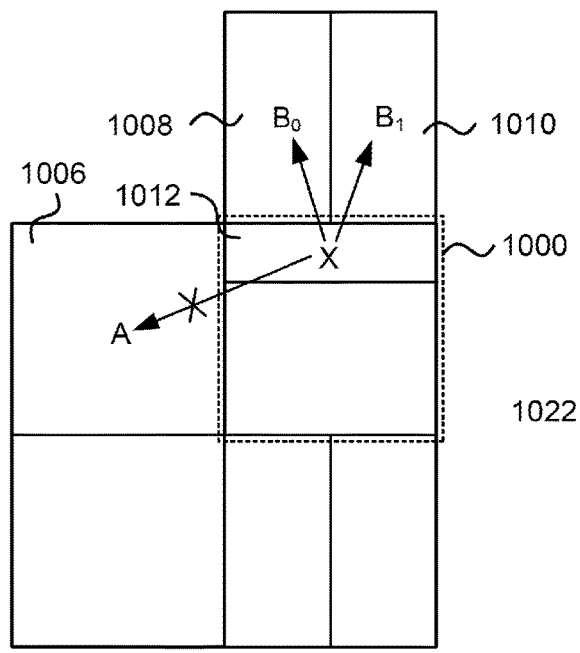
FIG. 10C is another illustration of a horizontally partitioned quad-tree plus binary tree (QTBT) asymmetric partition (AP) node.

FIG. 10C is another illustration of a horizontally partitioned quad-tree plus binary tree (QTBT) asymmetric partition (AP) node. FIG. 10C illustrates an example how to prepare a list of neighboring blocks for a sub-block being coded or decoded. The neighbor selection for the smaller sub-block 1012 depends on the partitioning type of the nodes to which candidate neighbor blocks belong to. If a candidate neighboring block adjacent to the shorter side of asymmetrically partitioned block does not belong to a smaller sub-block of an unequally partitioned, such a candidate neighboring block is not included into the list. Thus, the block 1006 is not included in the list of neighboring blocks, whereas blocks 1008, 1010 are included in the list of neighboring blocks when deriving a context model for splitting the smaller sub-block 1012.

Figure 10D:
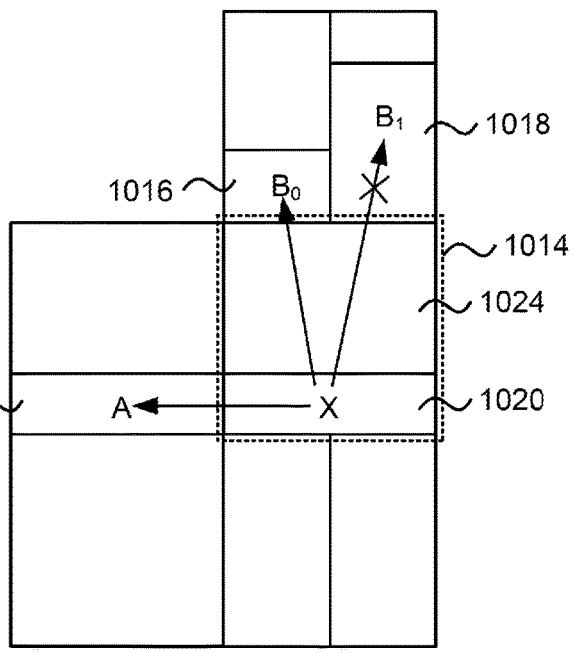
FIG. 10D is another illustration of a horizontally partitioned quad-tree plus binary tree (QTBT) asymmetric partition (AP) node.

FIG. 10D is another illustration of a horizontally partitioned quad-tree plus binary tree (QTBT) asymmetric partition (AP) node. FIG. 10D illustrates an example how to prepare a list of neighboring blocks for a sub-block being coded or decoded. The example illustrated in FIG. 10D differs from the example illustrated in FIG. 10C in that the blocks 1008, 1010 of FIG. 10C are now asymmetrically partitioned in FIG. 10D and that a smaller sub-block 1020 of the asymmetrically partitioned node 1014 is now the lower block of the asymmetrically partitioned node 1014. If a smaller sub-block is not aligned with the left or top side of the partitioned block, neighboring blocks are selected from the ones adjacent to the asymmetrically partitioned node 1014, and a larger sub-block 1024 of the asymmetrically partitioned node 1014 is omitted from the list of neighboring blocks when deriving a context model for splitting the smaller sub-block 1020. Moreover, for the case of the smaller sub-block 1020, candidate neighboring blocks should either be a result of equally-sized partitioning, or belong to smaller sub-blocks of unequally-sized partitioning. Potential neighboring blocks that are larger sub-blocks of unequally sized partitioning are not included to the list. Thus, the blocks 1016 and 1022 are included in the list of neighboring blocks whereas a block 1018 is omitted from list of neighboring blocks when deriving a context model for splitting the smaller sub-block 1020.

Figures 11A, 11B:
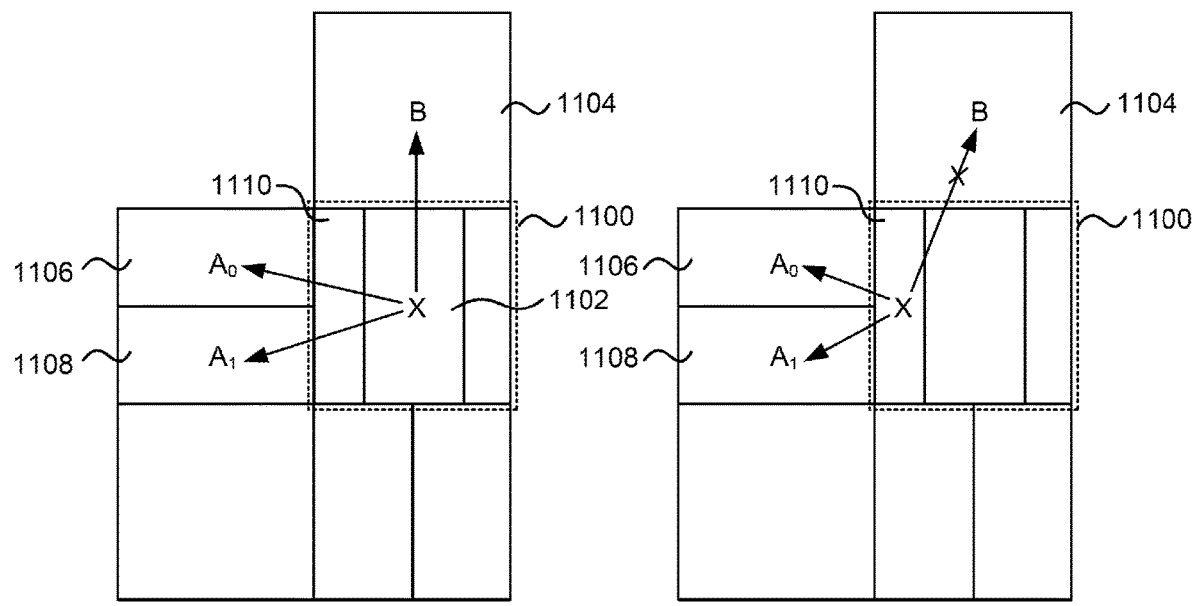
FIG. 11A is an illustration of a vertically partitioned quad-tree plus binary tree (QTBT) triple-tree (TT) node.
FIG. 11B is another illustration of a vertically partitioned quad-tree plus binary tree (QTBT) triple-tree (TT) node.

FIG. 11A is an illustration of a vertically partitioned quad-tree plus binary tree (QTBT) triple-tree (TT) node. FIG. 11A illustrates an example how to prepare a list of neighboring blocks for a sub-block being coded or decoded. A smaller sub-block 1110 of the triple-tree partitioned node 1100 is not included into a list of neighboring blocks when deriving a context model for splitting a larger sub-block 1102. Instead, neighboring blocks 1106, 1108, 1104 of the entire triple-tree partitioned node 1100 are included into the list of neighboring blocks when deriving the context model for splitting the larger sub-block 1102.

FIG. 11B is another illustration of a vertically partitioned quad-tree plus binary tree (QTBT) triple-tree (TT) node. FIG. 11B illustrates an example how to prepare a list of neighboring blocks for a sub-block being coded or decoded. The neighbor selection for the smaller sub-block 1110 also depends on the partitioning type of the nodes to which candidate neighbor blocks belong to. If a candidate neighboring block adjacent to the shorter side of triple-tree block does not belong to a smaller sub-block of an unequally partitioned block, such a candidate neighboring block is not included into the list. Thus, the block 1104 is not included in the list of neighboring blocks, whereas blocks 1106 and 1108 are included in the list of neighboring blocks when deriving a context model for splitting the smaller sub-block 1110.

Figure 11C:
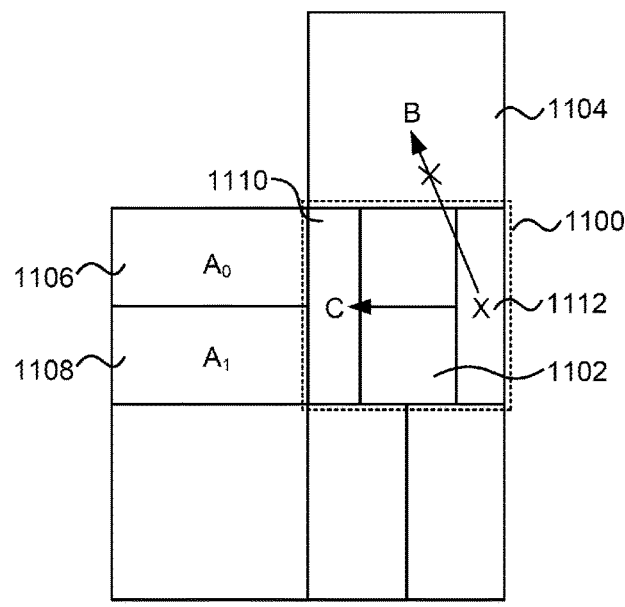
FIG. 11C is another illustration of a vertically partitioned quad-tree plus binary tree (QTBT) triple-tree (TT) node.

FIG. 11C is another illustration of a vertically partitioned quad-tree plus binary tree (QTBT) triple-tree (TT) node. FIG. 11C illustrates an example how to prepare a list of neighboring blocks for a sub-block being coded or decoded. The neighbor selection for a smaller sub-block 1112 depends on a size of the smaller sub-block 1112 of the triple-tree partitioned block 1100 and also on the partitioning type of the nodes to which candidate neighbor blocks belong to. If a candidate neighboring block adjacent to the shorter side of triple-tree block does not belong to a smaller sub-block of an unequally partitioned block, such a candidate neighboring block is not included into the list. Thus, the block 1104 is not included in the list of neighboring blocks. Further, the larger sub-block 1102 is omitted from the list of neighboring blocks, while the other smaller sub-block 1110 of the triple-tree partitioned block 1100 is included in the list of neighboring blocks when deriving a context model for splitting the smaller sub-block 1112.

Figure 12A:
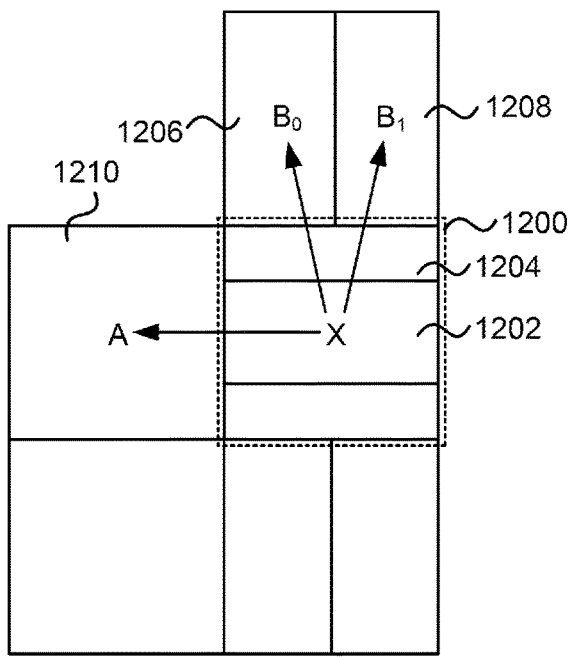
FIG. 12A is an illustration of a horizontally partitioned quad-tree plus binary tree (QTBT) triple-tree (TT) node.

FIG. 12A is an illustration of a horizontally partitioned quad-tree plus binary tree (QTBT) triple-tree (TT) node. FIG. 12A illustrates an example how to prepare a list of neighboring blocks for a sub-block being coded or decoded. A smaller sub-block 1214 of the triple-tree partitioned node 1200 is not included into a list of neighboring blocks when deriving a context model for splitting a larger sub-block 1202. Instead, neighboring blocks 1206, 1208, 1200 of the entire triple-tree partitioned node 1200 are included into the list of neighboring blocks when deriving the context model for splitting the larger sub-block 1202.

Figure 12B:
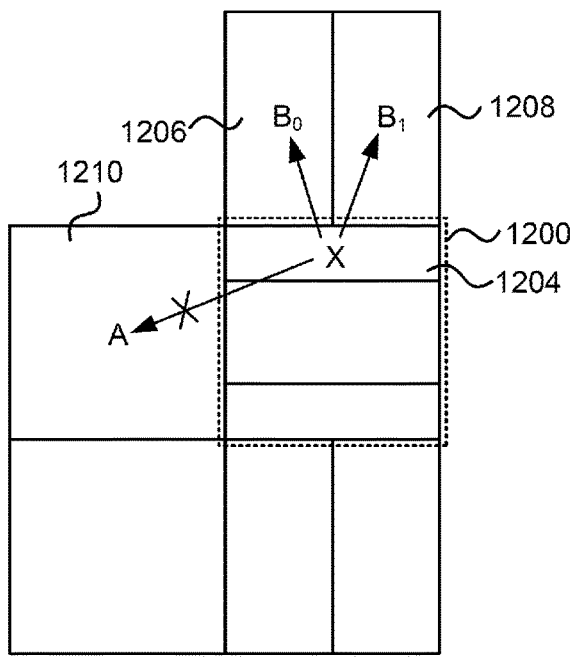
FIG. 12B is another illustration of a horizontally vertically partitioned quad-tree plus binary tree (QTBT) triple-tree (TT) node.

FIG. 12B is another illustration of a horizontally vertically partitioned quad-tree plus binary tree (QTBT) triple-tree (TT) node. FIG. 12B illustrates an example how to prepare a list of neighboring blocks for a sub-block being coded or decoded. The neighbor selection for the smaller sub-block 1204 also depends on the partitioning type of the nodes to which candidate neighbor blocks belong to. If a candidate neighboring block adjacent to the shorter side of triple-tree block does not belong to a smaller sub-block of an unequally partitioned block, such a candidate neighboring block is not included into the list. Thus, a block 1210 is not included in the list of neighboring blocks, whereas blocks 1206, 1208 are included in the list of neighboring blocks when deriving a context model for splitting the smaller sub-block 1204.

Figure 12C:
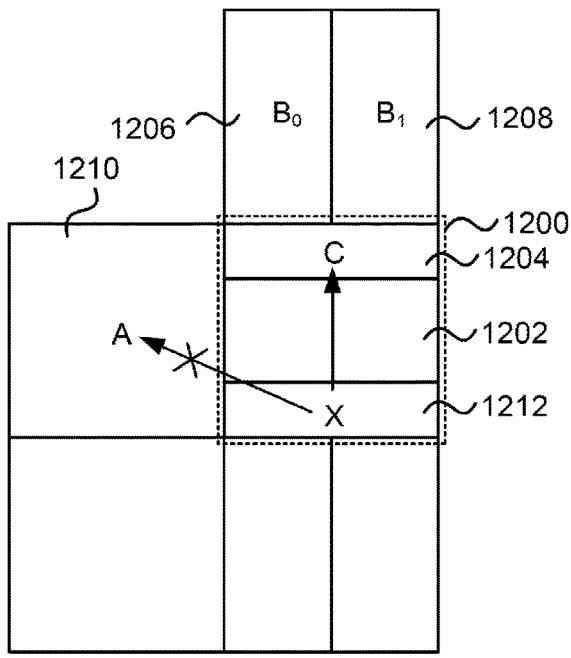
FIG. 12C is another illustration of a horizontally vertically partitioned quad-tree plus binary tree (QTBT) triple-tree (TT) node.

FIG. 12C is another illustration of a horizontally vertically partitioned quad-tree plus binary tree (QTBT) triple-tree (TT) node. FIG. 12C illustrates an example how to prepare a list of neighboring blocks for a sub-block being coded or decoded. The neighbor selection for a smaller sub-block 1212 depends on a size of the smaller sub-block 1212 of the triple-tree partitioned block 1200 and also on the partitioning type of the nodes to which candidate neighbor blocks belong to. If a candidate neighboring block adjacent to the shorter side of triple-tree block does not belong to a smaller sub-block of an unequally partitioned block, such a candidate neighboring block is not included into the list. Thus, the block 1210 is not included in the list of neighboring blocks. Further, the larger sub-block 1202 is omitted from the list of neighboring blocks, while the other smaller sub-block 1204 of the triple-tree partitioned block 1200 is included in the list of neighboring blocks when deriving a context model for splitting the smaller sub-block 1212.

Figure 13:
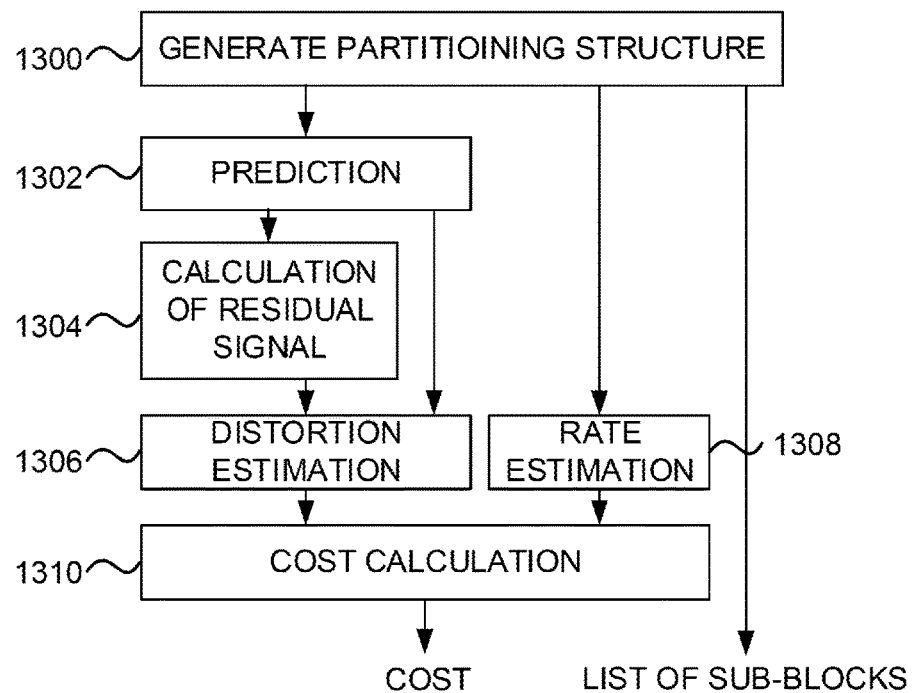
FIG. 13 illustrates a flow diagram of partitioning decision-making.

FIG. 13 illustrates a flow diagram of partitioning decision-making. Partitioning decisions at an encoder side may be made with taking into account resulting distortion of the reconstructed picture and the number of bits in the bit stream that is required to restore the picture at the decoder side. This rate-distortion optimization procedure requires that the number of bits to encode partitioning information is estimated at the encoding stage. This concept is illustrated in FIG. 13.

The steps shown in FIG. 13 may be performed several times to obtain various lists of sub-blocks and to estimate cost values for each of the generated lists. At 1300, a largest coding unit is covered with sub-blocks, i.e. a partitioning structure represented by a list of sub-blocks is generated. At 1302, for each of these sub-blocks a prediction signal is generated. Selection of the prediction mode may be performed according the RDO-based (Rate-Distortion Optimization) approach. At 1304, a residual signal is obtained by subtracting an original picture signal from the prediction signal and applying the following steps to the result: transform, quantization, inverse quantization and inverse transform. This residual signal is then added to the prediction signal thus generating a reconstructed signal used to estimate its distortion at 1306. The number of bits that are required to obtain the reconstructed signal is estimated at 1308. This step may perform entropy encoding and context modeling just as it is done during bit stream generation. However, no output bit stream signal is generated at this step. At 1310, cost calculation uses the estimate distortion and the rate values to combine them into a single metrics value making it possible to select the best partitioning structure using value comparison operation. Finally, a variant that provides the lowest value of the cost function is selected to be signaled into the bit stream.

Figure 14:
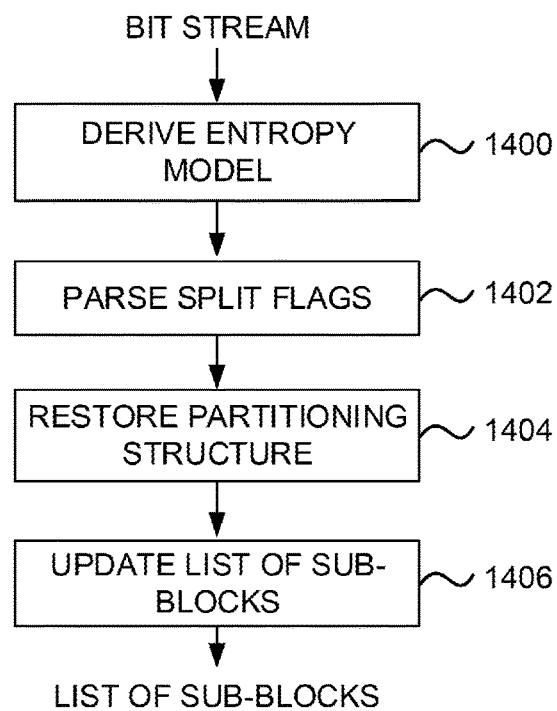
FIG. 14 illustrates a flow diagram of an exemplary decoder.

FIG. 14 illustrates a flow diagram of an exemplary decoder. A decoding process is performed for each largest coding unit (LCU) iteratively and may comprise the steps illustrated in FIG. 14. At 1400 a bit stream is decoded using a derived entropy model. This step may include steps illustrated in FIG. 7. At 1402, a result of step 1400 is used during split flag parsing. Depending on the value of the parsed split flag a decision is made whether a decoded block is further split into sub-blocks. At 1404, a partitioning type that is used to split a block is determined at the partitioning structure restoration. This step may use pre-defined limitations of split and corresponding bit stream syntax elements. At 1406 a list of sub-blocks that need to be reconstructed is updated. After this, the next block of an LCU is being decoded. When the last block of the LCU is processed the next LCU is decoded similarly as already illustrated above.

Several advantages can be achieved by various embodiments of the invention. For example, when preparing and applying the list of neighboring blocks as illustrated above, coding rate-distortion performance improved. Further, no significant hardware redesigns are needed.

The person skilled in the art will understand that the "blocks" or "units" of the various figures may represent or describe functionalities of embodiments of the invention (rather than necessarily individual "units" in hardware or software) and thus describe equally functions or features of apparatus embodiments as well as method embodiments.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

Embodiments of the encoder and/or decoder may be implemented as hardware, firmware, software or any combination thereof. For example, the functionality of the encoder/encoding or decoder/decoding may be performed by a processor, a processing circuitry, a microcontroller, a digital signal processor (DSP), a field programmable gate array (FPGA), an application-specific integrated circuit (ASIC), or the like.

The implementations can be performed using a digital storage medium, in particular a floppy disc, CD, DVD or Blu-Ray disc, a ROM, a PROM, an EPROM, an EEPROM or a Flash memory having electronically readable control signals stored thereon which cooperate or are capable of cooperating with a programmable computer system such that an embodiment of at least one of the inventive methods is performed.

The functionality of the encoder/encoding or decoder/decoding may be implemented by program instructions stored on a computer readable medium. The program instructions, when executed, cause the computer, processor or the like, to perform the steps of the encoding and/or decoding methods. The computer readable medium can be any medium, including non-transitory storage media, on which the program is stored such as a Blu-Ray disc, DVD, CD, USB (flash) drive, hard disc, server storage available via a network, a ROM, a PROM, an EPROM, an EEPROM or a Flash memory having electronically readable control signals stored thereon which cooperate or are capable of cooperating with a programmable computer system such that an embodiment of at least one of the inventive methods is performed.

The encoder and/or decoder may be implemented in various devices including a TV set, a set top box, a PC, a tablet, a smartphone, or the like. The functionality may be implemented by means of software, e.g. an application implementing the method steps.

An embodiment of the invention comprises or is a computer program comprising program code for performing any of the methods described herein, when executed on a computer.

An embodiment of the invention comprises or is a computer readable medium comprising a program code that, when executed by a processor, causes a computer system to perform any of the methods described herein.

Although the present invention and its advantages have been described in detail with reference to specific features and embodiments thereof, it is evident that that various changes, modifications, substitutions, combinations and alterations can be made thereto without departing from the spirit and scope of the invention as defined by the appended claims. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A picture encoding apparatus comprising processing circuitry configured to:
   hierarchically partition a block of picture data into sub-blocks;
   determine that a sub-block being encoded belongs to an unequally-sized partitioned block;
   prepare a list of neighboring blocks for the sub-block of the unequally-sized partitioned block based on a size of the sub-block of the unequally-sized partitioned block and a partitioning type of at least one neighboring block of the unequally-sized partitioned block;
   derive a context model that is used to encode split information of the sub-block of the unequally-sized partitioned block into a bit stream based on the list of neighboring blocks, wherein the sub-block of the unequally-sized partitioned block is a smaller sub-block of the unequally-sized partitioned;
   include a first neighboring block of the unequally-sized partitioned block in the list of neighboring blocks of the smaller sub-block, the first neighboring block being a result of an equally-sized partitioned block; and
   omit a second neighboring block adjacent to a shorter side of the smaller sub-block, the second neighboring block failing to be the smaller sub-block of the unequally-sized partitioned block, from the list of neighboring blocks of the smaller sub-block.

2. The picture encoding apparatus of any of claim 1, wherein the processing circuitry is further configured to:
   include another smaller sub-block of the unequally-sized partitioned block following the larger sub-block of the unequally-sized partitioned block in the list of neighboring blocks of the smaller sub-block;
   omit the larger sub-block of the unequally-sized partitioned block from the list of neighboring blocks of the smaller sub-block; and
   omit a neighboring block adjacent to a shorter side of the smaller sub-block, the neighboring block failing to be the smaller sub-block of the unequally-sized partitioned block, from the list of neighboring blocks of the smaller sub-block of the unequally-sized partitioned block.

3. The picture encoding apparatus of claim 1, wherein the processing circuitry is further configured to:
   include a first neighboring block of the unequally-sized partitioned block in the list of neighboring blocks of the smaller sub-block, the first neighboring block being the smaller sub-block of the unequally-sized partitioned block;
   omit the larger sub-block of the of the unequally-sized partitioned block based on that the smaller sub-block is not aligned with a left or a top side of the unequally-sized partitioned block; and
   omit a second neighboring block of the unequally-sized partitioned block from the list of neighboring blocks of the smaller sub-block, the second neighboring block being the larger sub-block of the unequally-sized partitioned block.

4. The picture encoding apparatus of claim 1, wherein the hierarchical partitioning comprises one of an asymmetric partitioning and a triple-tree partitioning.

5. A picture decoding apparatus comprising processing circuitry configured to:
   receive a bit stream;
   hierarchically partition a block of picture data into sub-blocks;
   determine that a sub-block being decoded belongs to an unequally-sized partitioned block;
   prepare a list of neighboring blocks for the sub-block of the unequally-sized partitioned block based on a size of the sub-block of the unequally-sized partitioned block and a partitioning type of at least one neighboring block of the unequally-sized partitioned block;
   derive a context model that is used to decode split information of the sub-block of the unequally-sized partitioned block from the bit stream based on the list of neighboring blocks, wherein the sub-block of the unequally-sized partitioned block is a smaller sub-block of the unequally-sized partitioned block;
   include a first neighboring block of the unequally-sized partitioned block in the list of neighboring blocks of the smaller sub-block, the first neighboring block being a result of an equally-sized partitioned block; and
   omit a second neighboring block adjacent to a shorter side of the smaller sub-block, the second neighboring block failing to be the smaller sub-block of the unequally-sized partitioned block, from the list of neighboring blocks of the smaller sub-block.

6. The picture decoding apparatus of claim 5, wherein the processing circuitry is further configured to:
   include another smaller sub-block of the unequally-sized partitioned block following the larger sub-block of the unequally-sized partitioned block in the list of neighboring blocks of the smaller sub-block;

omit the larger sub-block of the unequally-sized partitioned block from the list of neighboring blocks of the smaller sub-block; and omit a neighboring block adjacent to a shorter side of the smaller sub-block, the neighboring block failing to be the smaller sub-block of the unequally-sized partitioned block, from the list of neighboring blocks of the smaller sub-block of the unequally-sized partitioned block.

7. The picture decoding apparatus of claim 5, wherein the processing circuitry is further configured to:

include a first neighboring block of the unequally-sized partitioned block in the list of neighboring blocks of the smaller sub-block, the first neighboring block being the smaller sub-block of the unequally-sized partitioned block;

omit the larger sub-block of the of the unequally partitioned block based on that the smaller sub-block is not aligned with a left or a top side of the unequally partitioned sub-block; and omit a second neighboring block of the unequally-sized partitioned block from the list of neighboring blocks of the smaller sub-block, the second neighboring block being the larger sub-block of the unequally-sized partitioning block.

8. The picture decoding apparatus of claim 5, wherein the hierarchical partitioning comprises one of an asymmetric partitioning and a triple-tree partitioning.

9. A method for encoding a picture, the method comprising:

hierarchically partitioning a block of picture data into sub-blocks;

determining that a sub-block being encoded belongs to an unequally-sized partitioned block;

preparing a list of neighboring blocks for the sub-block of the unequally-sized partitioned block based on a size of the sub-block of the unequally-sized partitioned block and a partitioning type of at least one neighboring block of the unequally-sized partitioned block;

deriving a context model that is used to encode split information of the sub-block of the unequally-sized partitioned block into a bit stream based on the list of neighboring blocks, wherein the sub-block of the unequally-sized partitioned block is a smaller sub-block of the unequally-sized partitioned block;

include a first neighboring block of the unequally-sized partitioned block in the list of neighboring blocks of the smaller sub-block, the first neighboring block being a result of an equally-sized partitioned block; and omit a second neighboring block adjacent to a shorter side of the smaller sub-block, the second neighboring block failing to be the smaller sub-block of the unequally-sized partitioned block, from the list of neighboring blocks of the smaller sub-block.

10. A method for decoding a picture, the method comprising:

receiving a bit stream;

hierarchically partitioning a block of picture data into sub-blocks;

determining that a sub-block being decoded belongs to an unequally-sized partitioned block;

preparing a list of neighboring blocks for the sub-block of the unequally-sized partitioned block based on a size of the sub-block of the unequally-sized partitioned block and a partitioning type of at least one neighboring block of the unequally-sized partitioned block;

deriving a context model that is used to decode split information of the sub-block of the unequally-sized partitioned block from the bit stream based on the list of neighboring blocks, wherein the sub-block of the unequally-sized partitioned block is a smaller sub-block of the unequally-sized partitioned block;

include a first neighboring block of the unequally-sized partitioned block in the list of neighboring blocks of the smaller sub-block, the first neighboring block being a result of an equally-sized partitioned block; and omit a second neighboring block adjacent to a shorter side of the smaller sub-block, the second neighboring block failing to be the smaller sub-block of the unequally-sized partitioned block, from the list of neighboring blocks of the smaller sub-block.

11. A non-transitory computer-readable medium, having computer-executable program stored thereon and configured to perform a method according to claim 10, when the computer-executable program is executed on a computing device.

12. A non-transitory computer-readable medium, having computer-executable program stored thereon and configured to perform a method according to claim 9, when the computer-executable program is executed on a computing device.

* * * * *

UNITED STATES PATENT AND TRADEMARK OFFICE
CERTIFICATE OF CORRECTION

PATENT NO. : 11,245,897 B2  Page 1 of 1
APPLICATION NO. : 16/854665
DATED : February 8, 2022
INVENTOR(S) : Filippov et al.

It is certified that error appears in the above-identified patent and that said Letters Patent is hereby corrected as shown below:

On the Title Page

Page 2: Item (56), Other Publications, Citation 2, Line 2: "of ITU-T SG 16 WP 3 and ISO/EC JTC 1/SC 29/WG 11, 4th" should read -- of ITU-T SG 16 WP 3 and ISO/IEC JTC 1/SC 29/WG 11, 4th --.

Signed and Sealed this
Nineteenth Day of July, 2022

Katherine Kelly Vidal
*Director of the United States Patent and Trademark Office*